(12) United States Patent
Taneichi

(10) Patent No.: US 10,605,284 B2
(45) Date of Patent: Mar. 31, 2020

(54) COUPLING NUT AND HOLD-DOWN CONSTRUCTION METHOD

(71) Applicant: Kaoru Taneichi, Kanagawa (JP)

(72) Inventor: Kaoru Taneichi, Kanagawa (JP)

( * ) Notice: Subject to any disclaimer, the term of this patent is extended or adjusted under 35 U.S.C. 154(b) by 0 days.

(21) Appl. No.: 15/564,310

(22) PCT Filed: Apr. 10, 2015

(86) PCT No.: PCT/JP2015/002036
§ 371 (c)(1),
(2) Date: Oct. 4, 2017

(87) PCT Pub. No.: WO2016/162905
PCT Pub. Date: Oct. 13, 2016

(65) Prior Publication Data
US 2018/0135676 A1    May 17, 2018

(51) Int. Cl.
*F16B 7/06*      (2006.01)
*E04B 1/26*     (2006.01)
(Continued)

(52) U.S. Cl.
CPC .............. *F16B 7/06* (2013.01); *E04B 1/2604* (2013.01); *E04B 1/40* (2013.01); *F16B 37/0857* (2013.01); *E04B 2/706* (2013.01); *E04B 2001/2684* (2013.01); *E04B 2001/2688* (2013.01); *E04B 2001/2692* (2013.01); *E04B 2001/3583* (2013.01); *E04B 2103/04* (2013.01)

(58) Field of Classification Search
CPC ..... F16B 7/06; E04B 1/40; E04B 1/26; E04B 2/706; E04B 2103/04
See application file for complete search history.

(56) References Cited

U.S. PATENT DOCUMENTS

| | | | |
|---|---|---|---|
| 4,081,219 A * | 3/1978 | Dykmans | F16B 7/06 403/301 |
| 4,146,951 A * | 4/1979 | Howlett | E04C 5/122 29/452 |

(Continued)

FOREIGN PATENT DOCUMENTS

| | | |
|---|---|---|
| JP | 61-206109 U | 12/1986 |
| JP | 62-149609 U | 9/1987 |

(Continued)

*Primary Examiner* — Basil S Katcheves
*Assistant Examiner* — Omar F Hijaz
(74) *Attorney, Agent, or Firm* — Norris McLaughlin, P.A.

(57) ABSTRACT

A coupling nut includes: a simple fastening nut housing case having bolt insertion holes for insertion, from end portions of the simple nut housing case, of bolts to be coupled, and, in sections of the housing case toward end portions thereof, simple fastening nut housing portions configured to non-rotatably house simple fastening nuts that screw together with the bolts inserted into the bolt insertion holes; and a simple fastening nut that is housed in each simple fastening nut housing portion of the housing case, provided with at least two or more nut segments that are biased by biasing springs, and configured to screw together with a screw portion of the inserted bolt when the housing case is rotated in a screwing direction after insertion of the bolts. One simple fastening nut has a left-hand thread and the other has a right-hand thread.

4 Claims, 31 Drawing Sheets

(51) Int. Cl.
*E04B 1/41* (2006.01)
*E04B 1/35* (2006.01)
*E04B 2/70* (2006.01)
*F16B 37/08* (2006.01)

(56) References Cited

U.S. PATENT DOCUMENTS

| | | | | |
|---|---|---|---|---|
| 6,327,829 B1* | 12/2001 | Taguchi | ............. | E04B 5/023 403/305 |
| 7,144,530 B2* | 12/2006 | Ward | ............. | E04G 17/045 264/33 |
| 7,150,132 B2* | 12/2006 | Commins | ............. | E04B 1/26 52/293.3 |
| 8,708,629 B2* | 4/2014 | Smith | ............. | F16B 39/32 411/267 |
| 9,097,001 B2* | 8/2015 | Espinosa | ............. | E04B 1/2604 |
| 2007/0286702 A1* | 12/2007 | Smith | ............. | F16B 37/0857 411/432 |
| 2015/0219144 A1* | 8/2015 | Taneichi | ............. | F16B 39/282 411/190 |

FOREIGN PATENT DOCUMENTS

| | | | |
|---|---|---|---|
| JP | 5-35206 Y2 | | 9/1993 |
| JP | H07-119206 A | | 5/1995 |
| JP | 2012047244 A | * | 3/2012 |
| JP | 2013-87543 A | | 5/2013 |
| JP | 2013-234731 A | | 11/2013 |

* cited by examiner

COUPLING NUT AND HOLD-DOWN CONSTRUCTION METHOD

BACKGROUND OF THE INVENTION

1. Field of the Invention

The present invention relates to a coupling nut that is used to couple bolts in wooden housing and the like, and a hold-down construction method for wooden housing or light-gauge steel frame housing in which the coupling nut is used.

2. Description of the Related Art

Conventionally, when bolts are coupled in a construction method for wooden housing, a long nut in which the bolts can be screwed into both end portions thereof is used.

In addition, in a hold-down construction method for wooden housing, a hold-down component may be used. Alternatively, a through bolt may be used. However, in either case, the nut becomes loose and retightening is not able be performed.

A method in which a coil spring is wrapped around a nut and rotational force is applied to the nut by a returning force of the coil spring has been developed. However, the method becomes ineffective when the bolt rusts or threads become damaged, and is impermanent.

Therefore, in addition to a disadvantage in that the method is only able to be used simply for the coupling of bolts, there is a disadvantage in that, in the work of coupling the bolts and the long nut, the long nut or the bolt is required to be rotated by an amount corresponding to a screw length of the bolt and the long nut, and the work is troublesome and time-consuming.

[Patent Literature 1] Japanese Patent Laid-open Publication No. Heisei 7-119206

SUMMARY OF THE INVENTION

In light of conventional disadvantages such as those described above, an object of the present invention is to provide a coupling nut that enables bolts to be coupled easily in a short amount of time, automatic telescopic adjustment of coupled bolts and nuts, and continuous coupling even in cases in which bolt diameters differ.

The description above, other objects, and novel features of the present invention will become more completely clear when the following description is read with reference to the accompanying drawings.

However, the drawings are mainly for description and do not limit the technical scope of the present invention.

To achieve the above-described object, the present invention is composed of: a simple fastening nut housing case in which bolt insertion holes into which bolts to be coupled are able to be respectively inserted from both end portions are formed, and simple fastening nut housing portions that are able to non-rotatably house simple fastening nuts that screw together with the bolts inserted into the bolt insertion holes are formed in sections towards both end portions; and a simple fastening nut that is housed in each simple fastening nut housing portion of the simple fastening nut housing case, provided with at least two or more nut segments that are biased by biasing springs, and screws together with a screw portion of the inserted bolt when the simple fastening nut housing case is rotated in a screwing direction after insertion of the bolts. One simple fastening nut has a left-hand thread and the other has a right-hand thread.

In addition, the present invention is composed of: an anchor bolt that is fixed to a foundation of a wooden housing; a through bolt that is connected to the anchor bolt with a coupling nut therebetween; and a washer-fitted simple fastening nut that attaches the through bolt to a beam. The coupling nut is composed of: a simple fastening nut housing case in which bolt insertion holes into which bolts to be coupled are able to be respectively inserted from both end portions are formed, and simple fastening nut housing portions that are able to non-rotatably house simple fastening nuts that screw together with the bolts inserted into the bolt insertion holes are formed in sections towards both end portions; and a left-hand thread simple fastening nut and a right-hand thread simple fasting nut that are respectively housed in the simple fastening nut housing portions of the simple fastening nut housing case, each provided with at least two or more nut segments that are biased by biasing springs, and screws together with a screw portion of the inserted bolt when the simple fastening nut housing case is rotated in a screwing direction after insertion of the bolts.

Effects of the Invention

As is clear from the description above, the present invention achieves the effects listed below:

(1) According to a first aspect of the invention, as a result of the bolts being pressed into the simple fastening nut housing case from both end portions and the simple fastening nut housing case being rotated, the at least two or more nut segments of the simple fastening nuts non-rotatably housed inside the housing portions in both end portions and screw portions of the bolts are able to be screwed together.

Therefore, the bolts are able to be coupled by a simple operation.

(2) The right-hand thread nut and the left-hand thread nut are housed inside the housing portions provided towards both end portions of the simple fastening nut housing case. Therefore, coupling is able to be performed such that the length of the bolts to be coupled are extended and shortened based on a rotation direction of the simple fastening nut housing case as with a turnbuckle.

(3) According to a second aspect of the invention as well, effects similar to above-described (1) and (2) are achieved. In addition, through bolts having differing outer diameters are able to be coupled.

(4) According to a third aspect of the invention as well, effects similar to above-described (1) to (3) are achieved. In addition, the type of simple fastening nut that is housed inside the housing portion is able to be easily indicated by the outer shapes of the housing portions in both end portions of the simple fastening nut housing case.

(5) According to a fourth aspect of the invention as well, effects similar to above-described (1) and (2) are achieved. In addition, the simple nuts on each floor are able to be tightened when tightening is performed after loosening and tightening of the bolt in the uppermost section are repeated (the simple nuts in each section are evenly loosened). After tightening, loosening of nuts is able to be automatically corrected.

(6) According to a fifth aspect of the invention, effects similar to above-described (6) are achieved.

Figure 1:
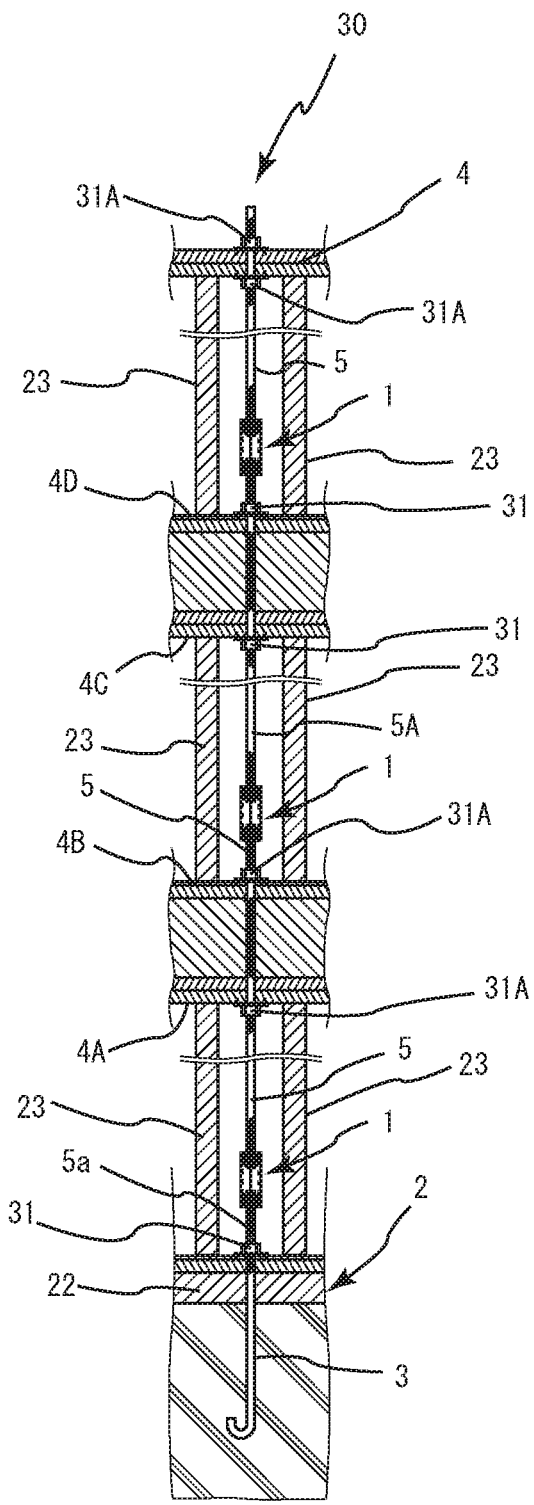
FIG. 1 is an explanatory diagram according to a first embodiment for carrying out the present invention.
Figure 2:
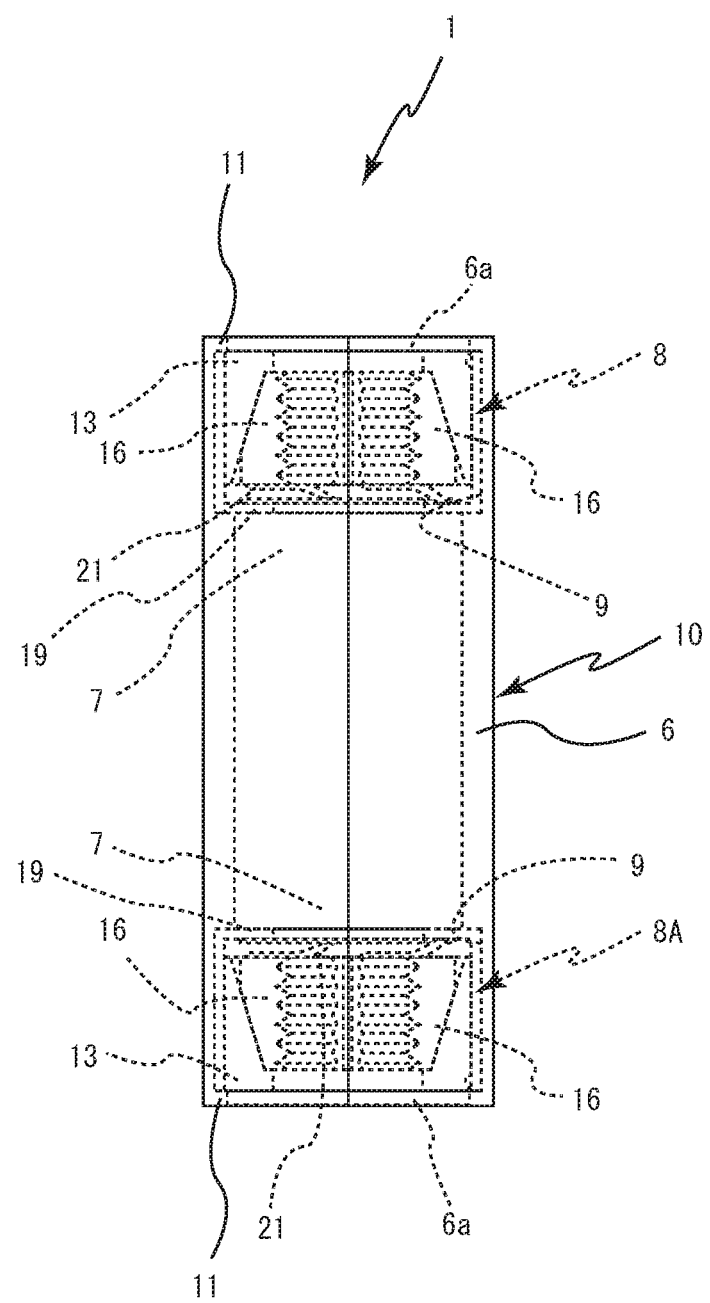
FIG. 2 is a front view of a coupling nut according to the first embodiment for carrying out the present invention.
Figure 3:
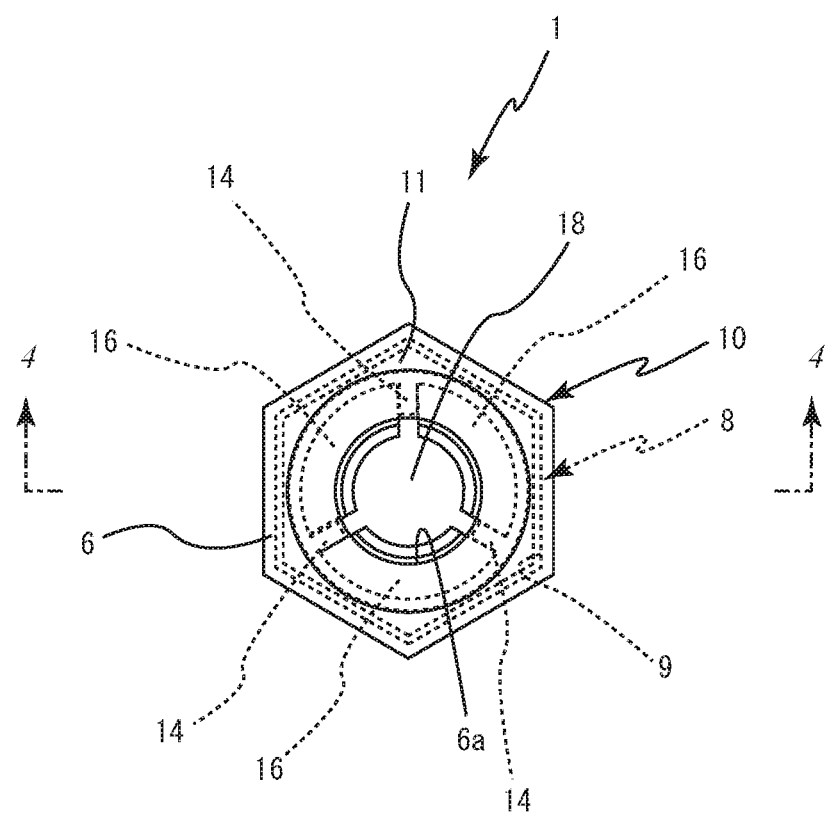
FIG. 3 is a planar view of the coupling nut according to the first embodiment for carrying out the present invention.
Figure 4:
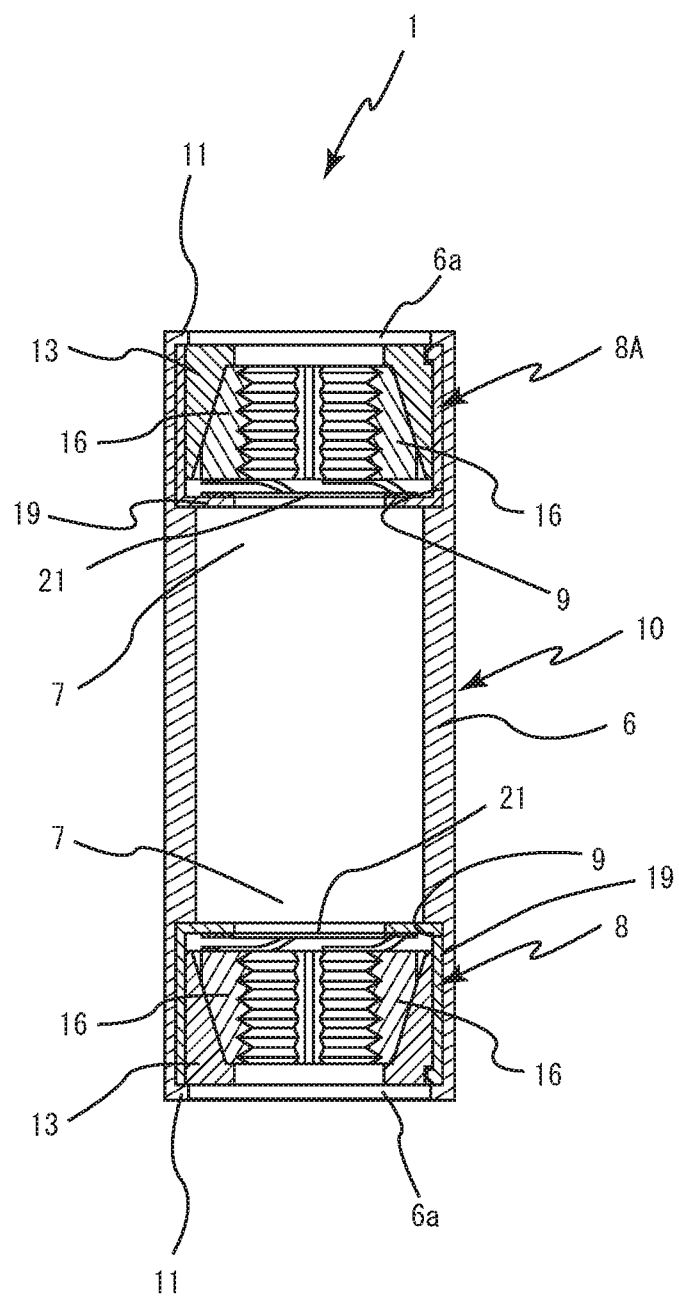
FIG. 4 is a cross-sectional view taken along line 4-4 in FIG. 3.
Figure 5:
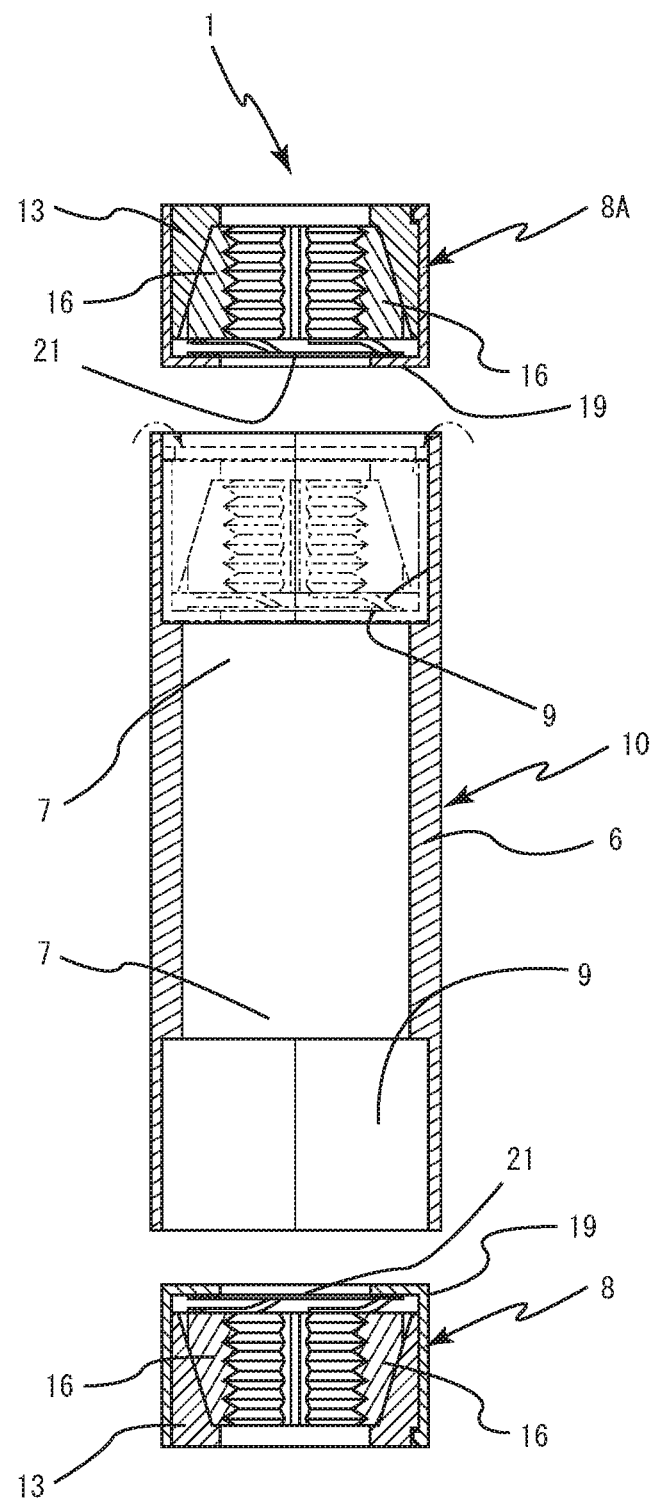
FIG. 5 is an exploded explanatory diagram of the coupling nut according to the first embodiment for carrying out the present invention.
Figure 6:
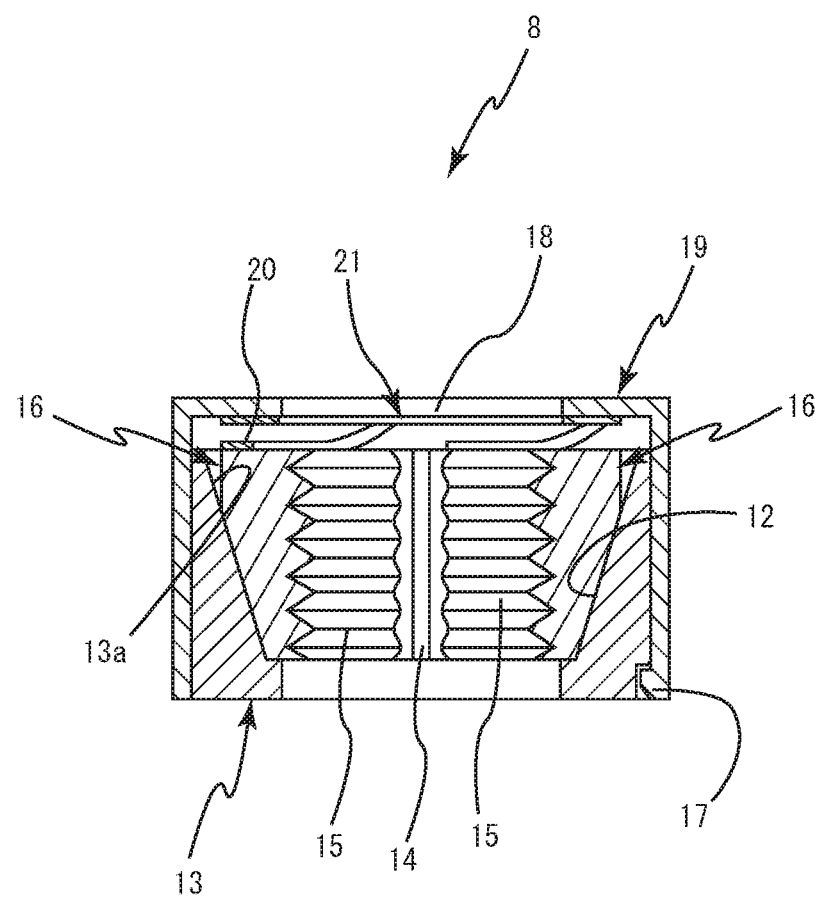
FIG. 6 is a cross-sectional view of a simple fastening nut.
Figure 7:
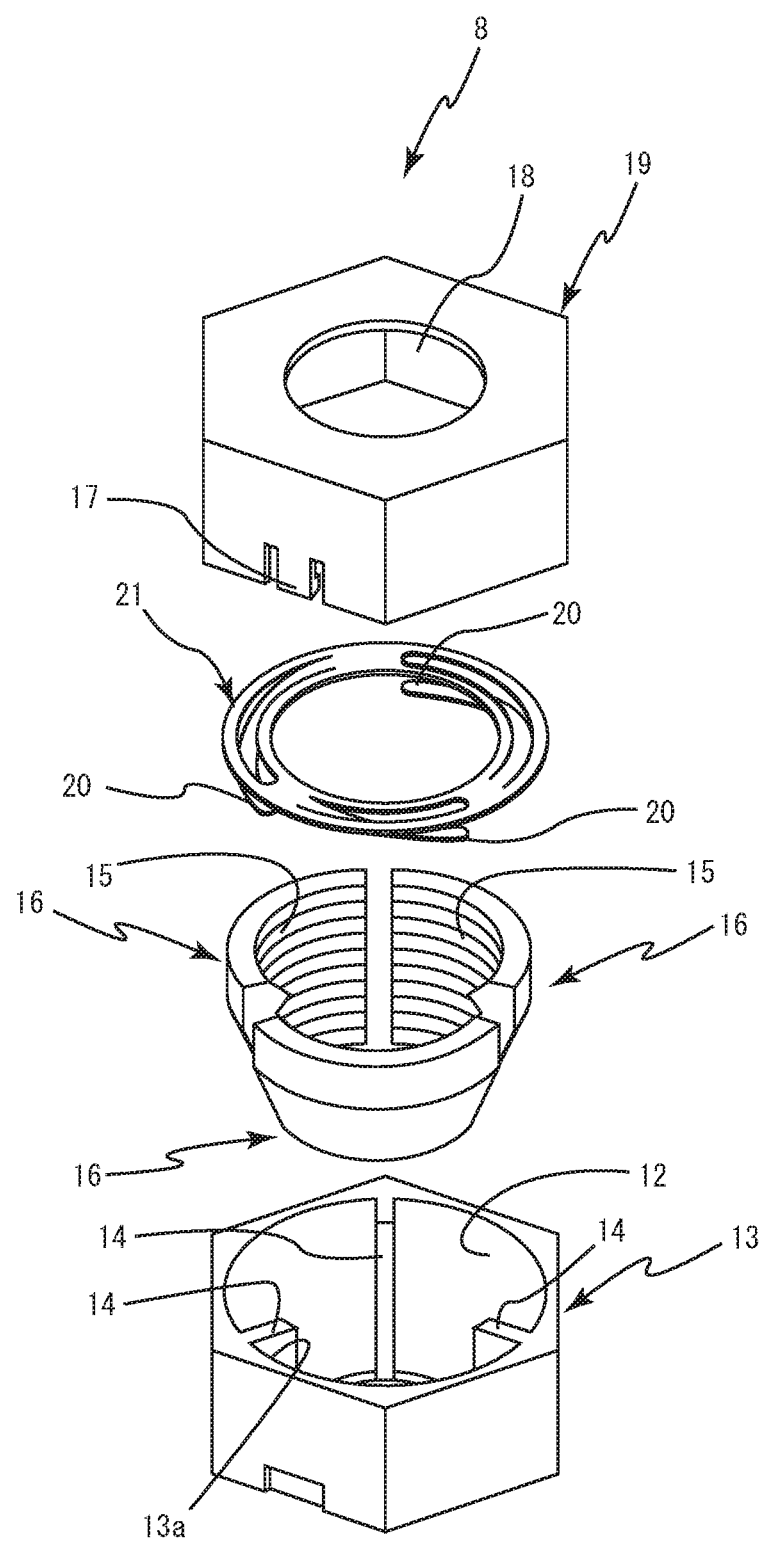
FIG. 7 is an exploded explanatory diagram of the simple fastening nut.
Figure 8:
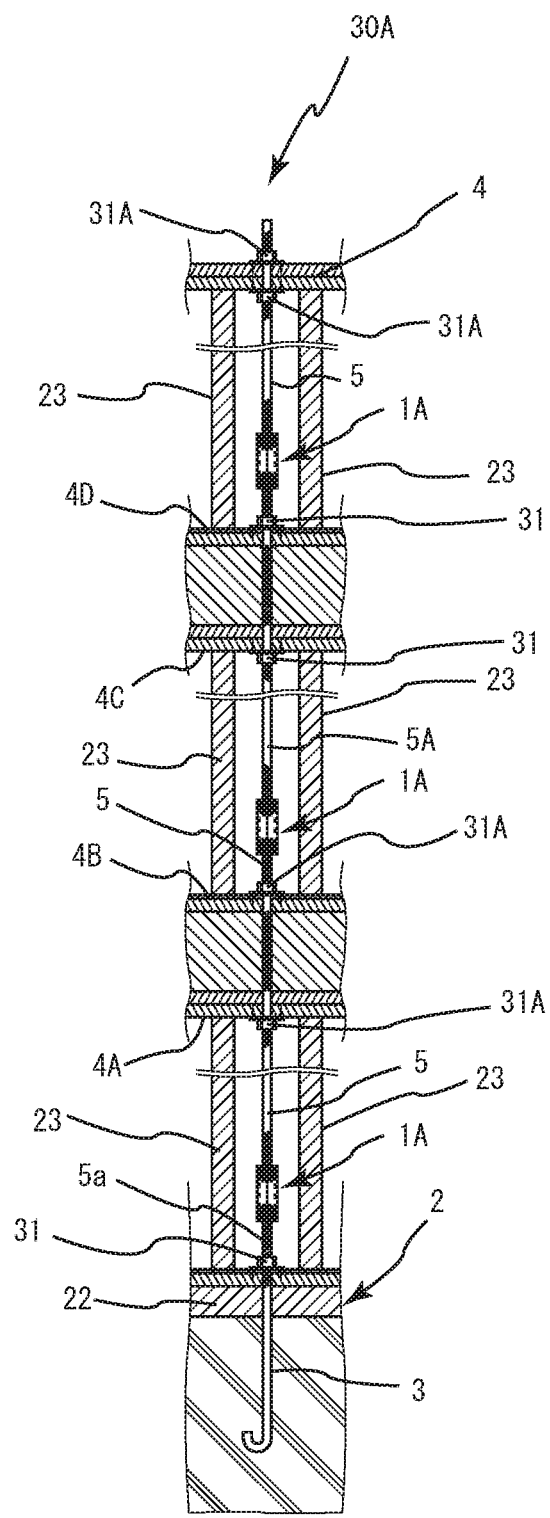
FIG. 8 is an explanatory diagram according to a second embodiment for carrying out the present invention.
Figure 9:
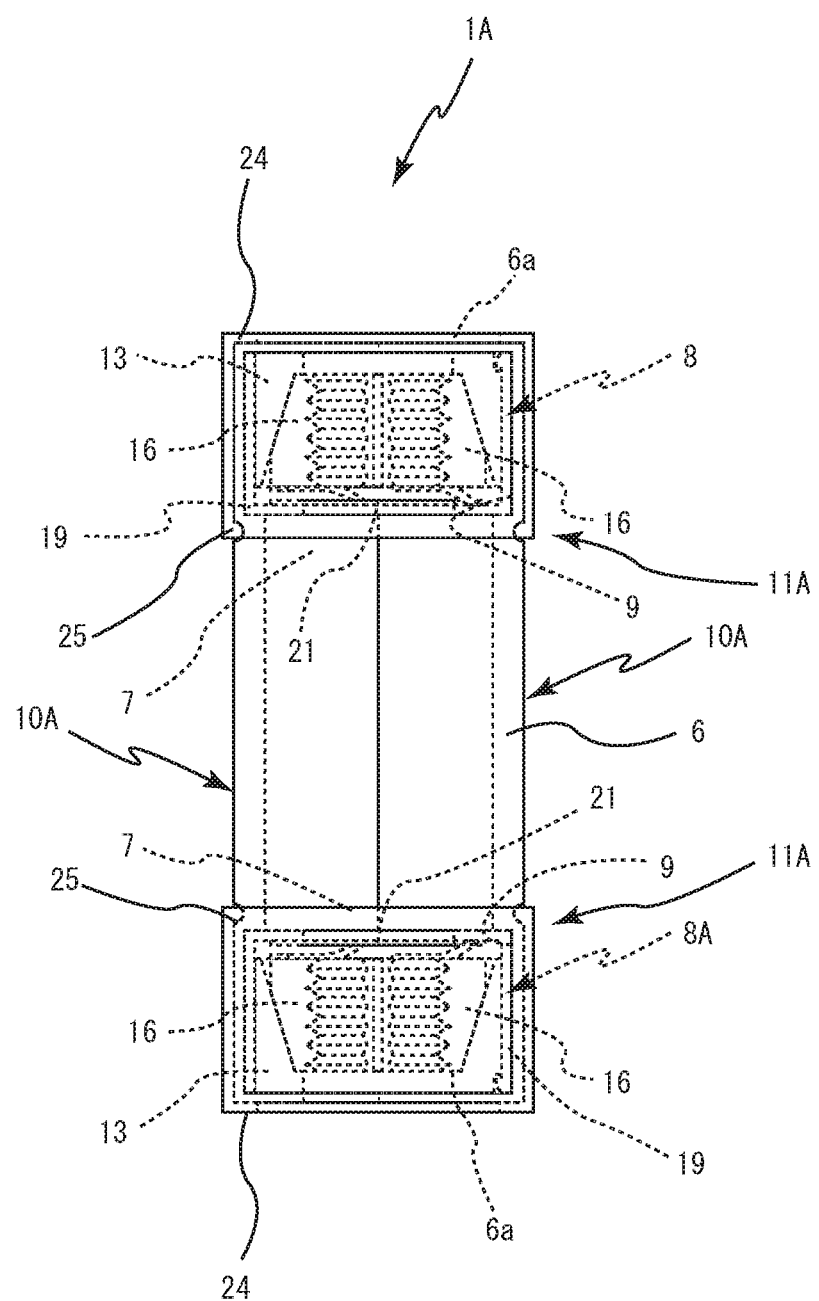
FIG. 9 is a front view of a coupling nut according to the second embodiment for carrying out the present invention.
Figure 10:
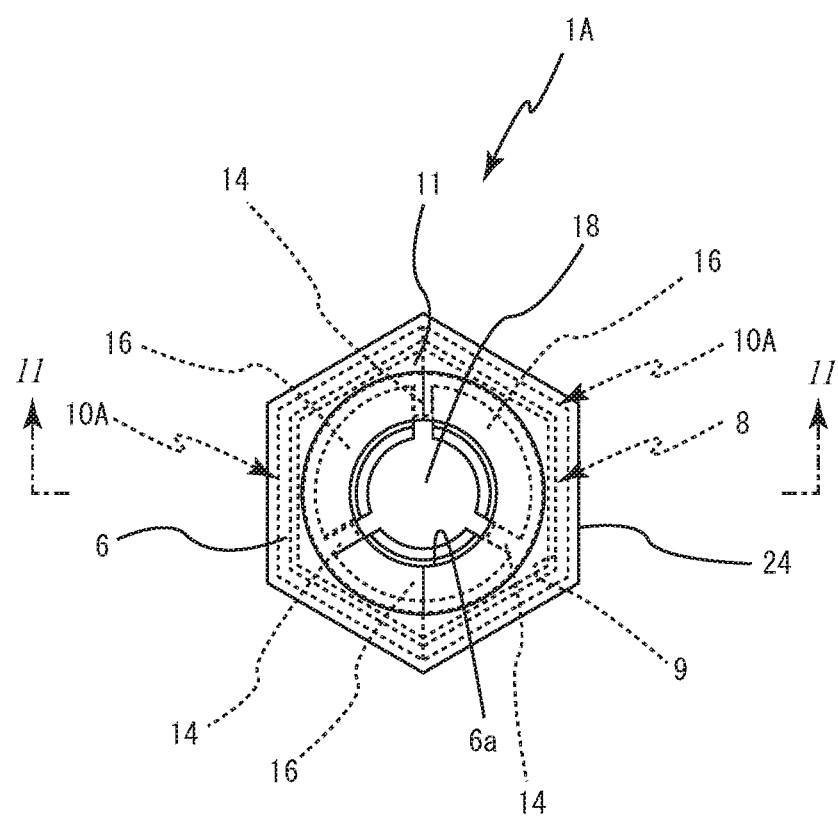
FIG. 10 is a planar view of the coupling nut according to the second embodiment for carrying out the present invention.
Figure 11:
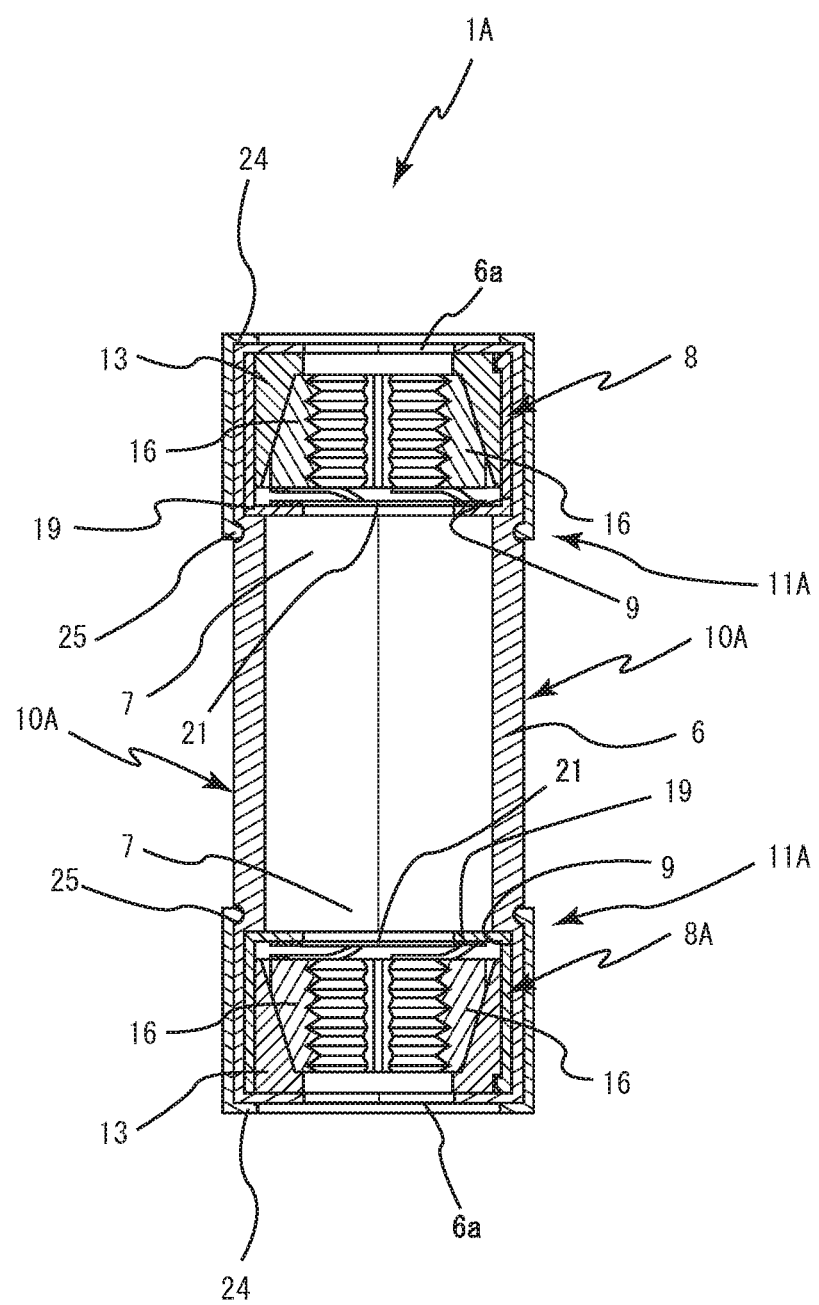
FIG. 11 is a cross-sectional view taken along line 11-11 in FIG. 10.

EXPLANATION OF REFERENCE NUMBERS 1, 1A, 1B, 1C, 1D, 1E, 1F: coupling nut
2: foundation
3: anchor bolt
4: beam
5, 5A: through bolt
6: cylindrical member
7: small-diameter portion
8, 8A, 8B, 8C: simple fastening nut
9, 9A, 9B: simple fastening nut housing case
11, 11A: blocking means
12: slant hole
13: inner cylindrical member
14: guide piece
15: thread
16: nut segment
17: attaching means
18: bolt insertion hole
19: outer cylindrical member
20: flat spring
21: washer
22: base
23: column
24: cover cylinder
25: crimp
26: coil spring
27: fixing band
28: fixture
29: frame
30, 30A, 30B, 30C, 30D, 30E 30F, and 30G: reinforcing construction method for wooden housing
31: washer-fitted simple fastening nut
32: attachment component

DETAILED DESCRIPTION OF THE PREFERRED EMBODIMENTS

The present invention will be described in detail based on embodiments for carrying out the present invention shown in the drawings.

According to a first embodiment for carrying out the present invention shown in FIG. 1 to FIG. 7, reference number 1 represents a coupling nut of the present invention. The coupling nut 1 couples a plurality of through bolts 5, 5, and 5 that fix an anchor bolt 3 that is embedded in and fixed to a foundation 2 of a wooden housing, and a beam 4 on an uppermost floor of the wooden housing. The coupling nut 1 is configured by a simple fastening nut housing case 10, simple fastening nuts 8 and 8A, and a blocking means 11. The simple fastening nut housing case 10 is composed of a cylindrical member 6 that is formed into a circular cylindrical shape or a polygonal shape (a hexagonal shape according to the embodiments of the presents invention) and has a bolt insertion hole 6a, and simple fastening nut housing portions 9 and 9 that are formed towards both end portions of the cylindrical member 6 with small-diameter portions 7 and 7 therebetween, such that same through bolts 5 and 5, or a right-hand thread through bolt 5 and a left-hand thread through bolt 5A, are able to be inserted from both end portions, that are provided with a turnbuckle function, and that are capable of respectively housing simple fastening nuts 8 and 8A in a non-rotatable manner. Outer peripheral portions of the simple fastening nut housing portions 9 and 9 have a polygonal shape or a circular cylindrical shape. The simple fastening nuts 8 and 8A are respectively housed inside the simple fastening nut housing portions 9 and 9 in both end portions of the simple fastening nut housing case 10. The blocking means 11 blocks the simple fastening nuts 8 and 8A from falling out of the simple fastening nut housing portions 9 and 9 after the simple fastening nuts 8 and 8A are housed inside the simple fastening nut housing portions 9 and 9 of the simple fastening nut housing case 10. The blocking means 11 is achieved by tip end portions of the simple fastening nut housing portions 9 and 9 being crimped.

In addition, a reinforcing construction method 30 for wooden housing of the invention of the present application is configured by the anchor bolt 3 that is fixed to the foundation 2 of the wooden housing, the through bolt 5 that is connected to the anchor bolt 3 by the coupling nut 1, and the washer-fitted simple fastening nut 8 that attaches the through bolt 5 to a beam.

The above-described simple fastening nuts 8 and 8A are each configured by an inner cylindrical member 1, at least two or more (three according to the embodiments of the present invention) guide pieces 14, 14, and 14, nut segments 16, 16, and 16, an outer cylindrical member 19, and a washer 21. Aslant hole 12 of which an inner diameter successively becomes smaller is formed in the inner cylindrical member 1. The guide pieces 14, 14, and 14 are formed in an axial-center direction of an inner wall surface 13a of the inner cylindrical member 13. The nut segments 16, 16, and 16 are each attached between the guide pieces 14, 14, and 14 in a slidable manner in the axial-center direction and have threads 15 on an inner wall surface that screw together with the through bolt 5. The outer cylindrical member 19, which has a polygonal shape, is attached such as to cover an outer peripheral portion of the inner cylindrical member 13 by an attaching means 17 that performs locking by the inner cylindrical member 13 being pressed therein, and has a bolt insertion hole 18 in a rear end portion thereof. The washer 21 has flat springs 20, 20, and 20 that are attached between the outer cylindrical member 19 and the inner cylindrical member 13 such as to press against the nut segments 16, 16, and 16 at all times.

When the coupling nut 1, configured as described above, is provided with the turnbuckle function and the plurality of through bolts 5 and 5 are coupled, the coupling nut 1 in which right-hand thread and left-hand thread simple fastening nuts 8 and 8A are housed in the simple fastening nut housing units 9 and 9 in both end portions is used.

As the simple fastening nut 8A, the simple fastening nut 8A in which threads 15A in an opposite direction are formed in the nut segments 16, 16, and 16 is used.

When the anchor bolt 3 that is embedded in and fixed to the foundation 2 of the wooden housing and the beam 4 of the uppermost floor, such as a third floor, are fixed by coupling of the plurality of through bolts 5, 5A, and 5, first, a base 22 through which the anchor bolt 3 passes is fixed to the foundation 2 by a washer-fitted simple fastening nut 31 being pressed onto the anchor bolt 3, the washer-fitted simple fastening nut 31 being rotated in a fastening direction, and a screw portion 3a of the anchor bolt 3 and the threads 15, 15, and 15 of the nut segments 16, 16, and 16 of the washer-fitted simple fastening nut 31 thereby being screwed together.

Next, at an upper portion of the anchor bolt 3, a first through bolt 5 that passes through a ceiling beam 4A and a floor beam 4B above the anchor bolt 3 and is positioned above the anchor bolt 3 is connected.

At this time, when the anchor bolt 3 has a right-hand thread, the coupling nut 1 is positioned such that the right-hand thread simple fastening nut 8 side is a lower portion thereof, and a head portion of the anchor bolt 3 is inserted by a predetermined amount.

Next, a lower end portion of the first bolt 5 having a left-hand thread is inserted by a predetermined amount into the left-hand thread simple fastening nut 8A side of the coupling nut 1. The coupling nut 1 is rotated, and the screw portions and threads of the anchor bolt 3, the coupling nut 1, and the first through bolt 5 are screwed together.

At this time, the anchor bolt 3 and the first through bolt 5 are screwed together such that a length thereof is extended or shortened based on a rotation direction of the coupling nut 1.

In addition, before the coupling nut 1 is screwed together with the first through bolt 5, a washer-fitted simple fastening nut 31A into which the first through bolt 5 has been inserted to fix to the ceiling beam 4A is moved to a position that enables fixing of a lower portion of the ceiling beam 4A. The washer-fitted simple fastening nut 31A is rotated at this position, and the threads 15A of the washer-fitted simple fastening nut 31A are screwed together with the screw portion 5a of the first bolt 5.

Furthermore, the washer-fitted simple fastening nut 31A is pressed onto the upper portion of the first through bolt 5, positioned at the floor beam 4B, and rotated at this portion. As a result, the threads 15A of the washer-fitted simple fastening nut 31A and the screw portion 5a of the first through bolt 5 are screwed together, and the floor beam 4B and the first bolt 5 are fixed.

Next, an upper end portion of the first through bolt 5 is inserted by a predetermined amount into the coupling nut 1 that is set such that the left-hand thread simple fastening nut 8A side is a lower portion thereof.

Subsequently, a lower end portion of a right-hand thread second through bolt 5A that passes through a ceiling beam 4C of a second floor section and a floor beam 4D of a third floor section and is positioned above the coupling nut 1 is inserted by a predetermined amount into the above-described right-hand thread simple fastening nut A in the upper portion of the coupling nut 1. The coupling nut 1 is rotated, and the screw portions and threads of the first through bolt 5, the coupling nut 1, and the second through bolt 5A are screwed together in a manner enabling length adjustment.

At this time as well, in a manner similar to that described above, the second through bolt 5A is fixed to the ceiling beam 4C of the second floor section and the floor beam 4D of the third floor section by the washer-fitted simple fastening nuts 31 and 31.

Next, an upper end portion of the second through bolt 5A is inserted by a predetermined amount into the coupling nut 1 that is set such that the right-hand thread simple fastening nut 8 side is a lower portion thereof.

Subsequently, a lower end portion of a left-hand thread third through bolt 5 that passes through the ceiling beam 4 of the third floor section and is positioned above the coupling nut 1 is inserted by a predetermined amount into the left-hand thread simple fastening nut 8A that is positioned at the upper portion of the coupling nut 1. The coupling nut 1 is rotated, and the screw portions and threads of the second through bolt 5A, the coupling nut 1, and the third through bolt 5 are screwed together in a manner enabling length adjustment.

At this time as well, in a manner similar to that described above, the third through bolt 5 is fixed to the upper and lower portions of the ceiling beam 4 of the third floor section by the washer-fitted simple fastening nuts 31A and 31A.

Here, reference numbers 23, 23, 23, 23, 23, and 23 represent columns composed of wood that are respectively provided between the foundation 2 and the ceiling beam 4A at both end portions of the first through bolt 5, the floor beam 4B of the second floor section and the ceiling beam 4C of the second floor section at both end portions of the first through bolt 5A, and the floor beam 4D of the third floor section and the ceiling beam 4 of the third floor section at both end portions of the third through bolt 5.

As the simple fastening nuts that fix the base 22, the ceiling beam 4A of a first floor section, the floor beam 4B of the second floor section, the ceiling beam 4C of the second floor section, the floor beam 4D of the third floor section, and the ceiling beam 4 of the third floor section, a simple fastening nut in which a flange that projects further outward than the outer cylindrical member 19 and in which a screw insertion hole is formed is provided in the inner cylindrical member 13 may be used.

In addition, the washer-fitted simple fastening nut 31 is configured such that a washer for fixing to a beam or the like is rotatably provided in the simple fastening nut 8. An inner structure of the nut is similar to that of the simple fastening nut 8.

Other Embodiments for Carrying Out the Invention

Next, other embodiments for carrying out the present invention, shown in FIG. 8 to FIG. 31, will be described. Regarding the descriptions of the other embodiments for carrying out the present invention, constituent sections that are identical to those according to the above-described first embodiment for carrying out the present invention are given the same reference numbers. Redundant descriptions are omitted.

A second embodiment for carrying out the present invention shown in FIG. 8 to FIG. 11 mainly differs from the first embodiment for carrying out the present invention in that a simple fastening nut housing case 10A, cover cylinders 24 and 24, and a blocking means 11A are used. In the simple fastening nut housing case 10A, the cylindrical member 6 and the simple fastening nut housing portions 9 and 9 integrally formed in the upper and lower portions of the cylindrical member 6 are divided into two in the axial center direction. The cover cylinders 24 and 24 cover the outer peripheral portions of the simple fastening nut housing portions 9 and 9, and the blocking means 11A blocks the cover cylinders 24 and 24 from detaching from the simple fastening nut housing portions 9 and 9 by crimps 25 and 25, after the simple fastening nuts 8 and 8A are housed in the simple fastening nut housing portions 9 and 9 of the simple fastening nut housing case 10A. A coupling nut 1A that is configured as described above and a reinforcing construction method 30A for wooden housing achieve working effects similar to those according to the above-described first embodiment for carrying out the present invention.

Figure 12:
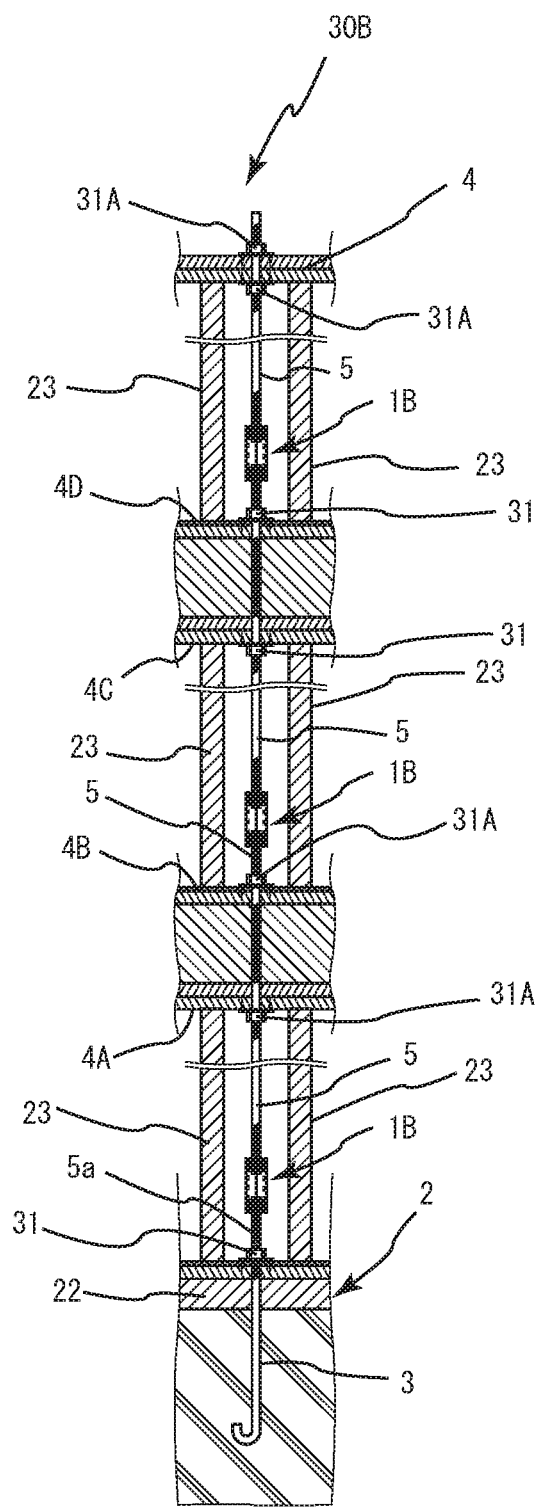
FIG. 12 is an explanatory diagram according to a third embodiment for carrying out the present invention.
Figure 13:
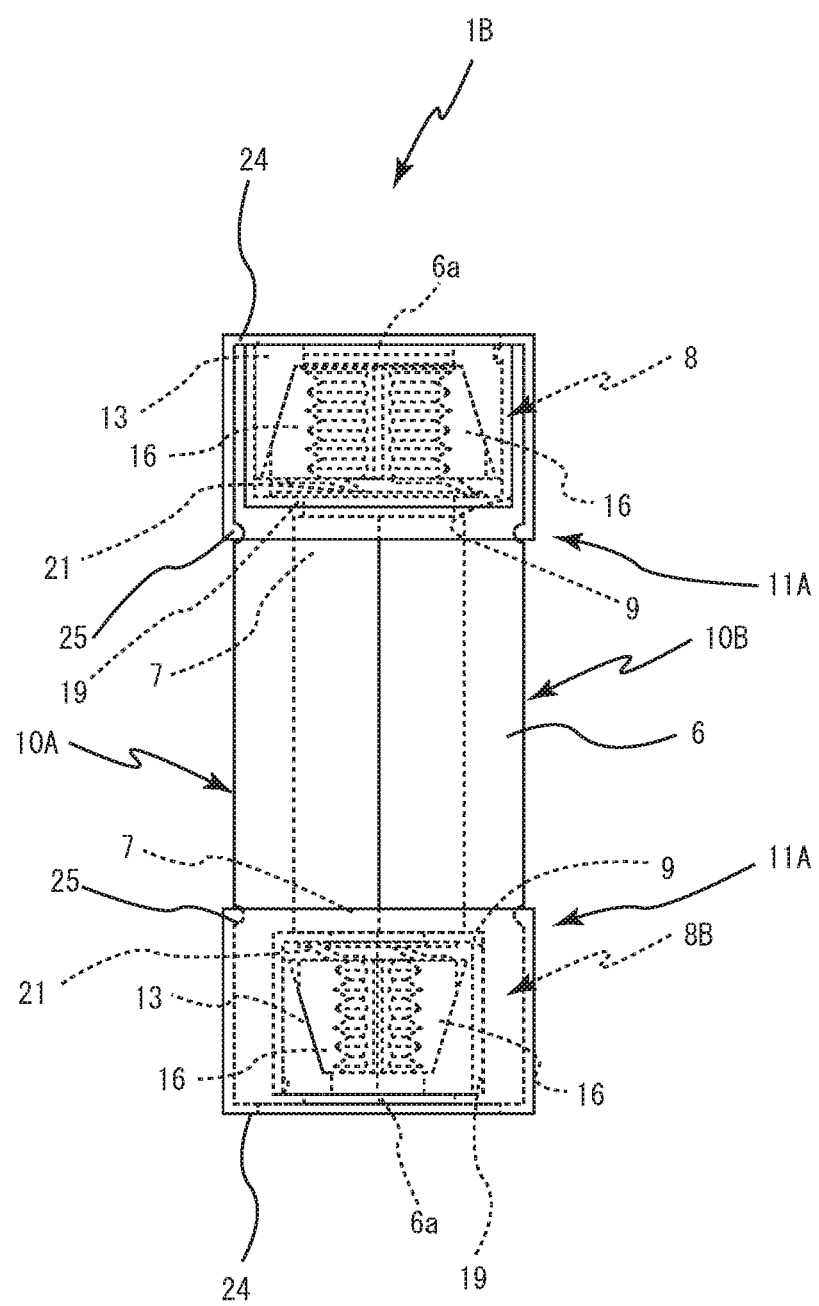
FIG. 13 is a front view of a coupling nut according to the third embodiment for carrying out the present invention.
Figure 14:
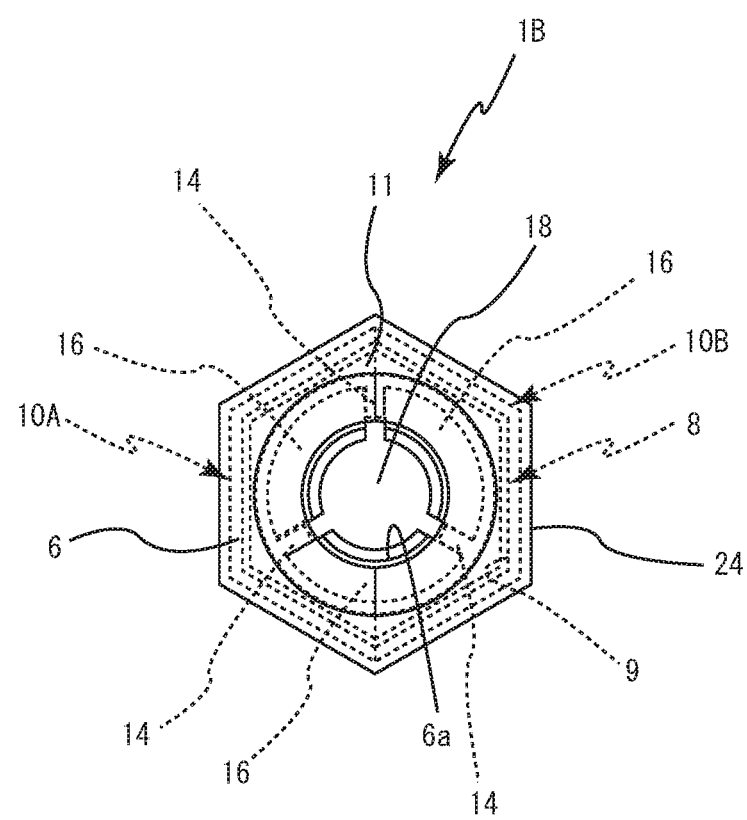
FIG. 14 is a planar view of the coupling nut according to the third embodiment for carrying out the present invention.

A third embodiment for carrying out the present invention shown in FIG. 12 to FIG. 14 mainly differs from the above-described second embodiment for carrying out the present invention in that a simple fastening nut housing case 10B is used. In the simple fastening nut housing case 10B, the simple fastening nut housing portions 9 and 9A of differing sizes that are capable of housing simple fastening nuts 8 and 8B of differing nut diameters are formed. The third embodiment also differs in that a small-diameter left-hand thread simple fastening nut 8B is housed in the simple fastening nut housing portion. A coupling nut 1B that is configured as described above and a reinforcing construction method 30B for wooden housing also enable through bolts 5 and 5C of differing diameters to be coupled. For example, coupling in which the through bolt 5 on the lower side has a large diameter and a through bolt 5C on the upper side has a small diameter is able to be achieved.

Figure 15:
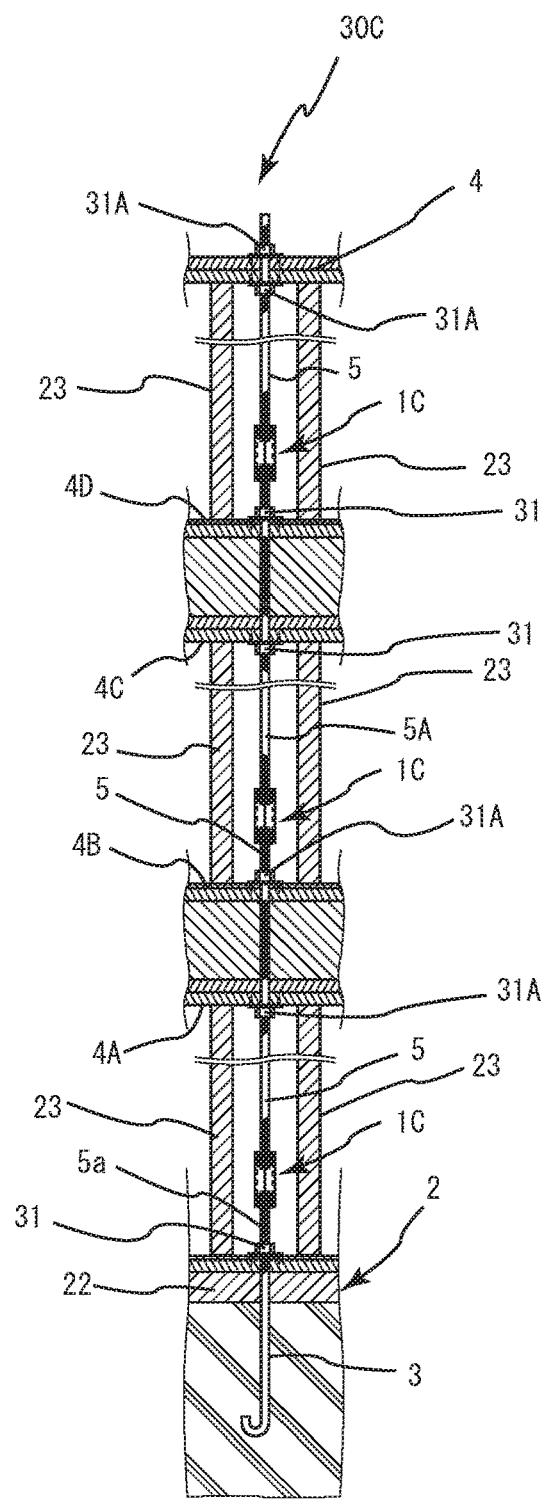
FIG. 15 is an explanatory diagram according to a fourth embodiment for carrying out the present invention.
Figure 16:
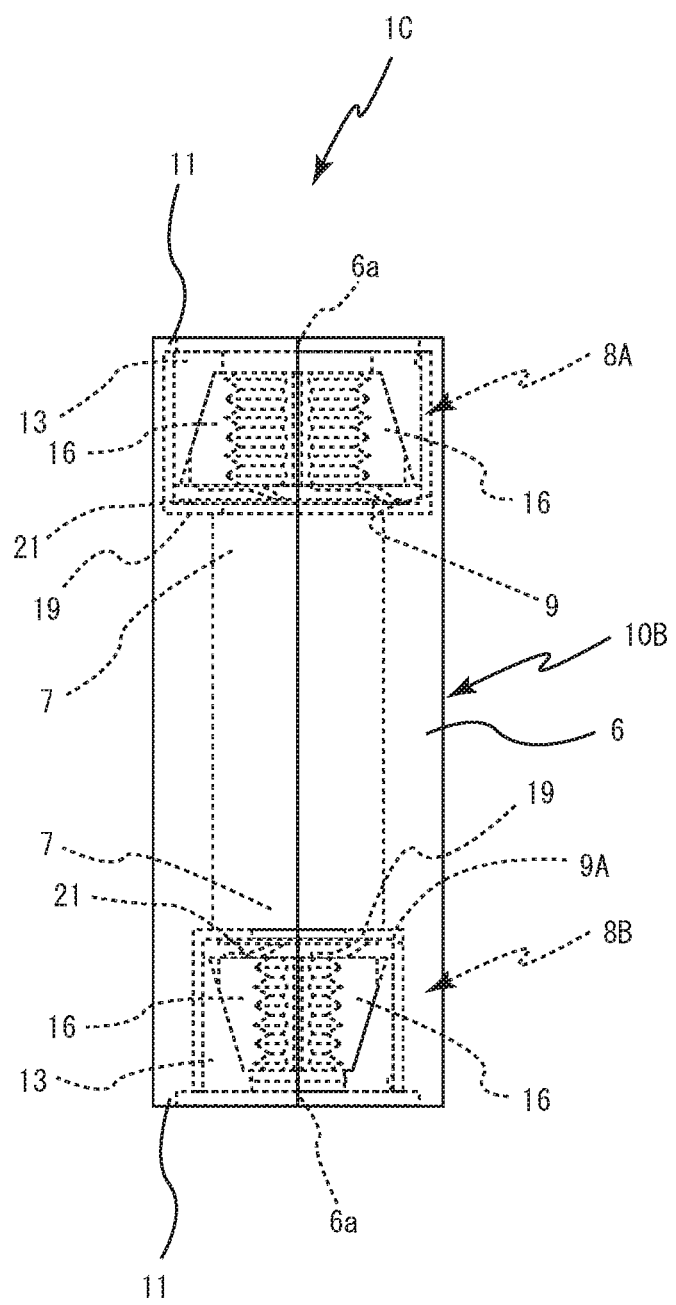
FIG. 16 is a front view of a coupling nut according to the fourth embodiment for carrying out the present invention.
Figure 17:
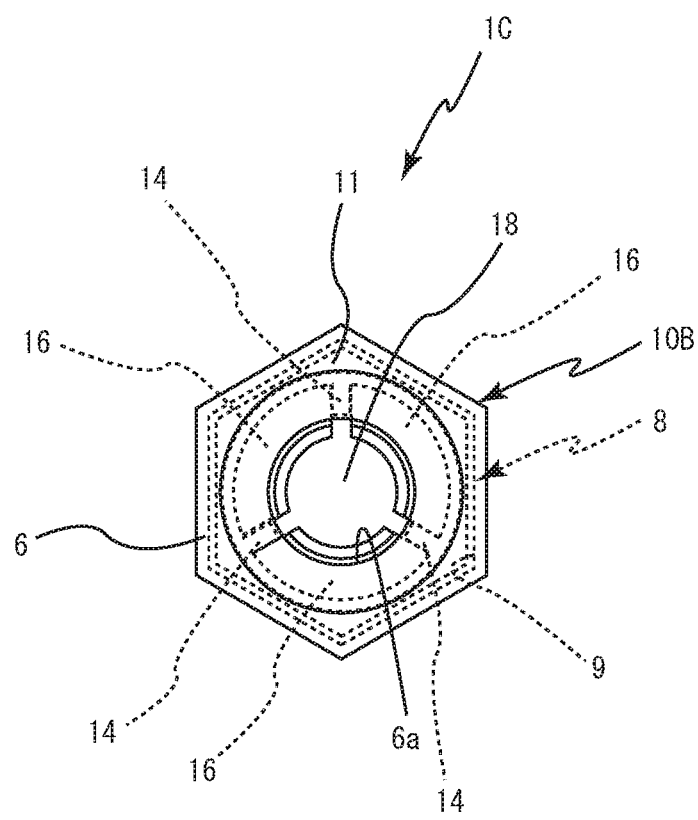
FIG. 17 is a planar view of the coupling nut according to the fourth embodiment for carrying out the present invention.

A fourth embodiment for carrying out the present invention shown in FIG. 15 to FIG. 17 mainly differs from the above-described third embodiment for carrying out the present invention in that the left-hand thread simple fastening nut 8A and the small-diameter right-hand thread simple fastening nut 8B are housed in the simple fastening nut housing portions 9 and 9A of differing sizes. A coupling nut 1C that is configured as described above and a reinforcing construction method 30C for wooden housing also achieve working effects similar to those according to the above-described third embodiment for carrying out the present invention.

Figure 18:
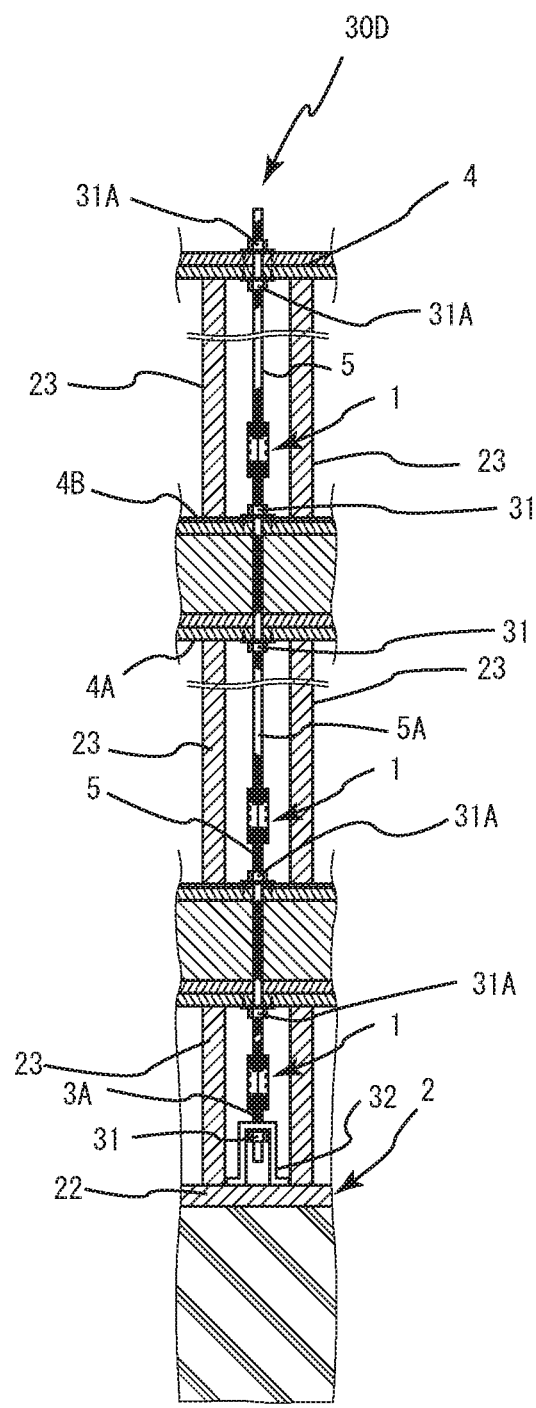
FIG. 18 is an explanatory diagram according to a fifth embodiment for carrying out the present invention.
Figure 19:
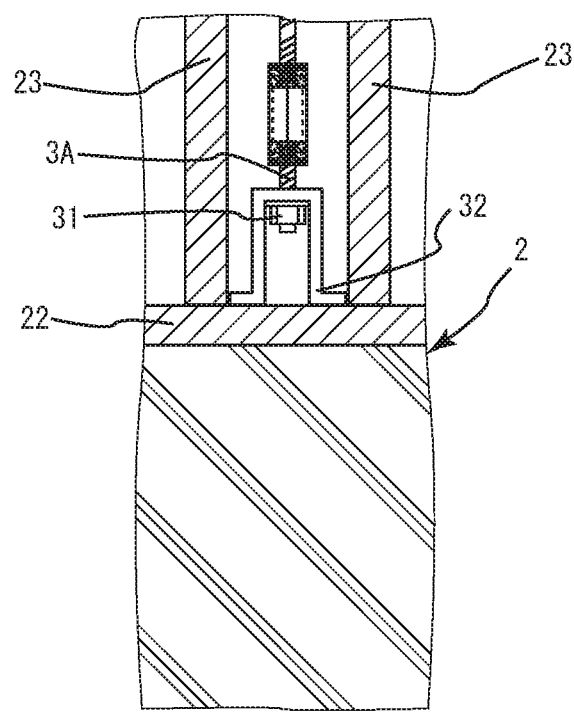
FIG. 19 is an explanatory diagram of a main section according to the fifth embodiment for carrying out the present invention.
Figure 20:
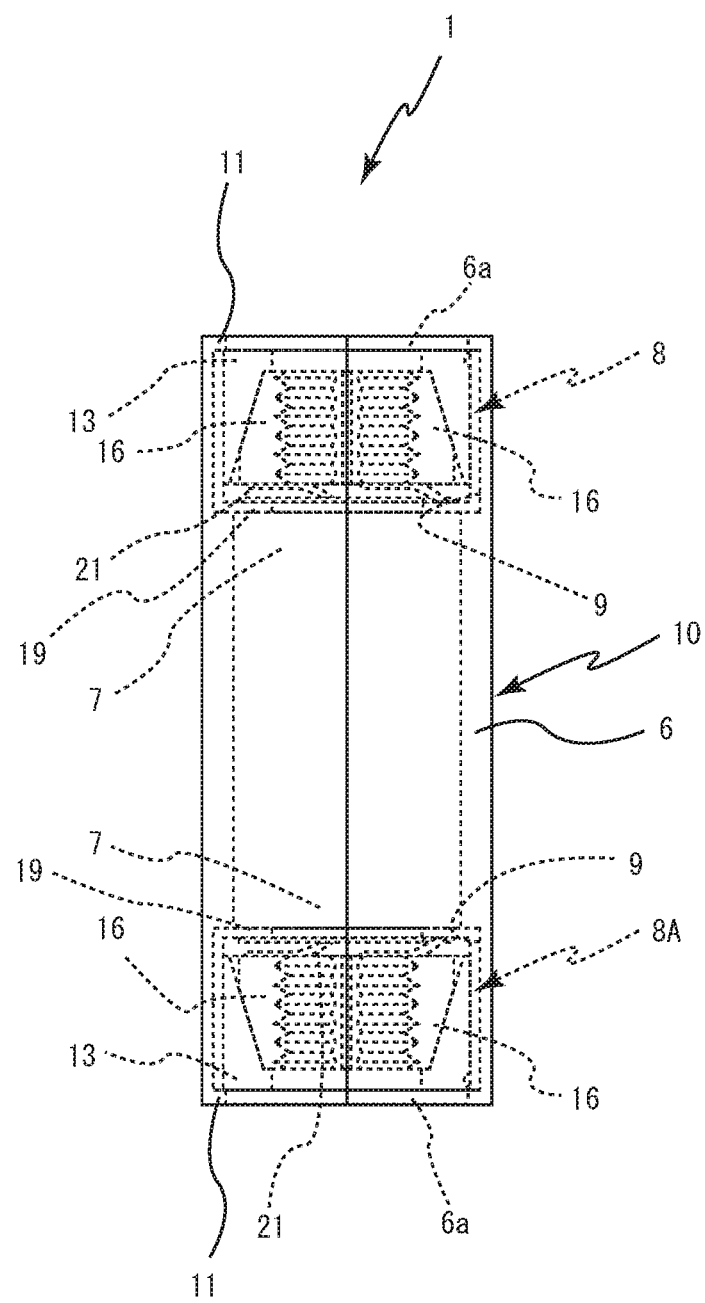
FIG. 20 is a front view of a coupling nut according to the fifth embodiment for carrying out the present invention.

A fifth embodiment for carrying out the present invention shown in FIG. 18 to FIG. 20 mainly differs from the above-described first embodiment for carrying out the present invention in that an attachment component 32 is fixed to the base 22 that is fixed to the foundation 2, an anchor bolt 3A is fixed to the attachment component 32, and the anchor bolt 3A and the through bolt 5 are coupled by the coupling nut 1. A reinforcing construction method 30D for wooden housing such as this also achieve working effects similar to those according to the above-described first embodiment for carrying out the present invention.

The attachment component 32 may be joined to the anchor bolt 3. In addition, the attachment component 32 may be welded or fastened with a bolt to an iron base or the like.

Figure 21:
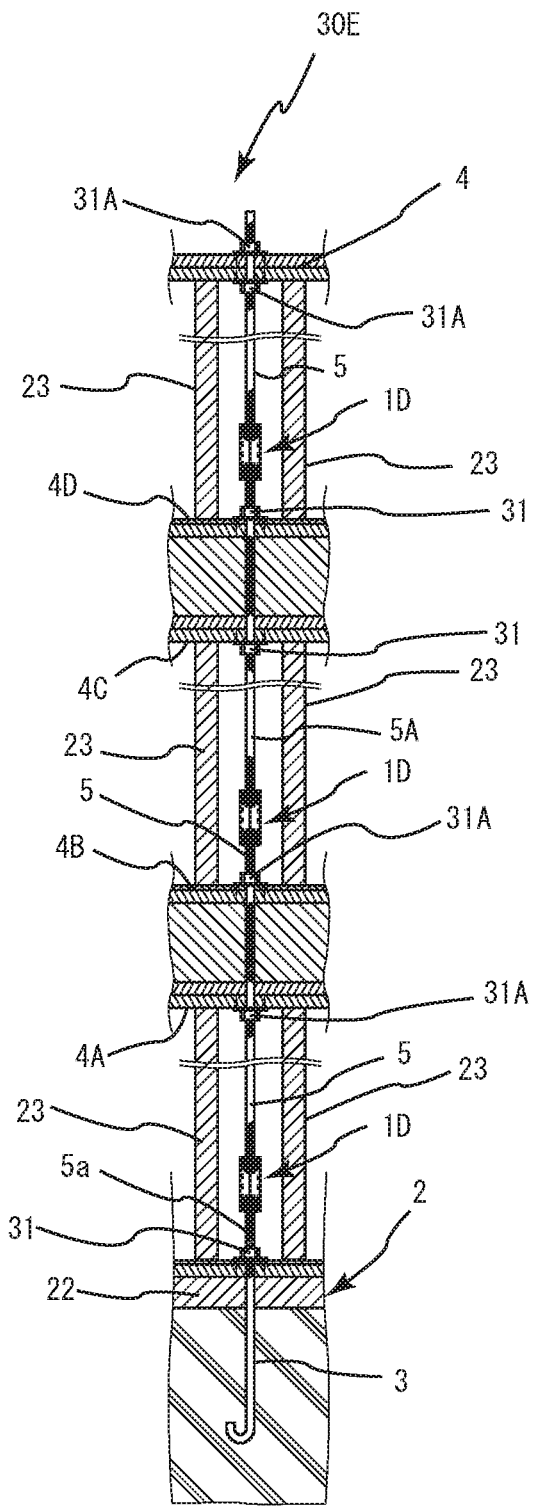
FIG. 21 is an explanatory diagram according to a sixth embodiment for carrying out the present invention.
Figure 22:
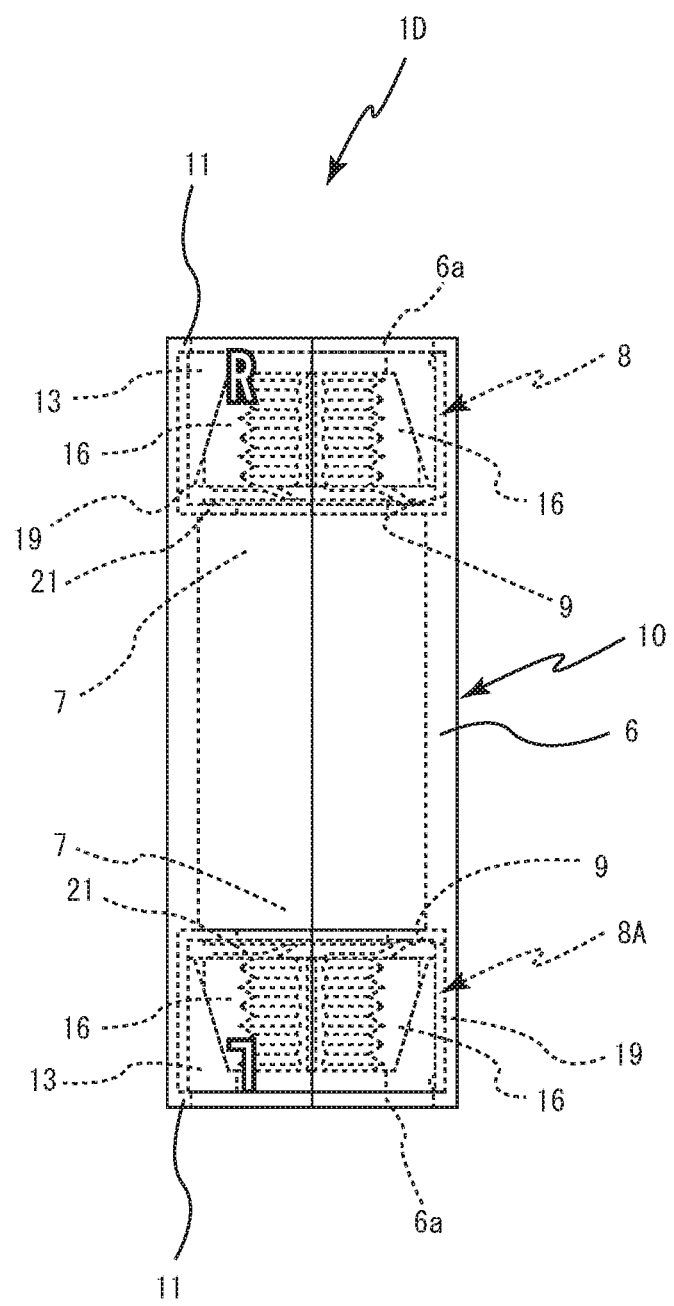
FIG. 22 is a front view of a coupling nut according to the sixth embodiment for carrying out the present invention.
Figure 23:
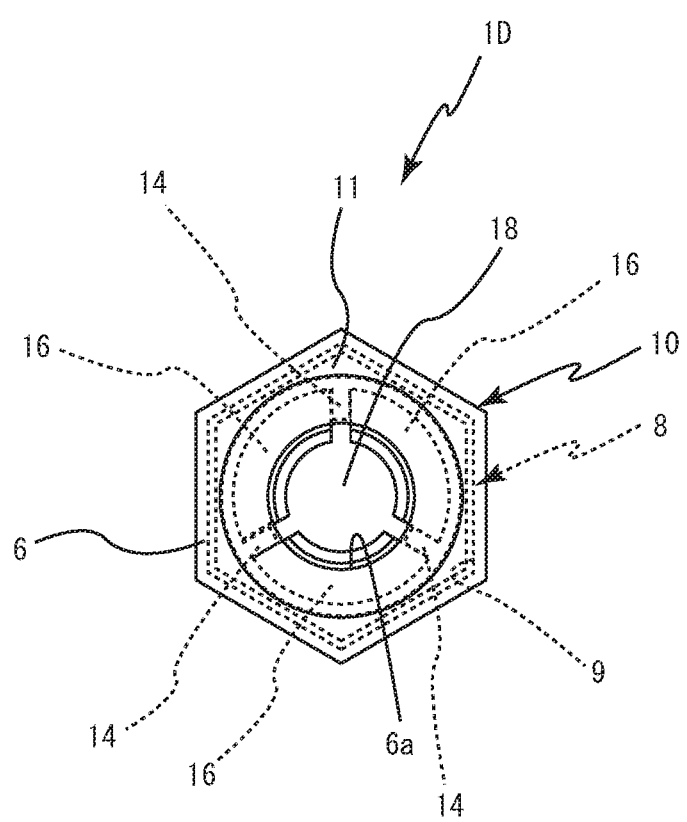
FIG. 23 is a planar view of the coupling nut according to the sixth embodiment for carrying out the present invention.
Figure 24:
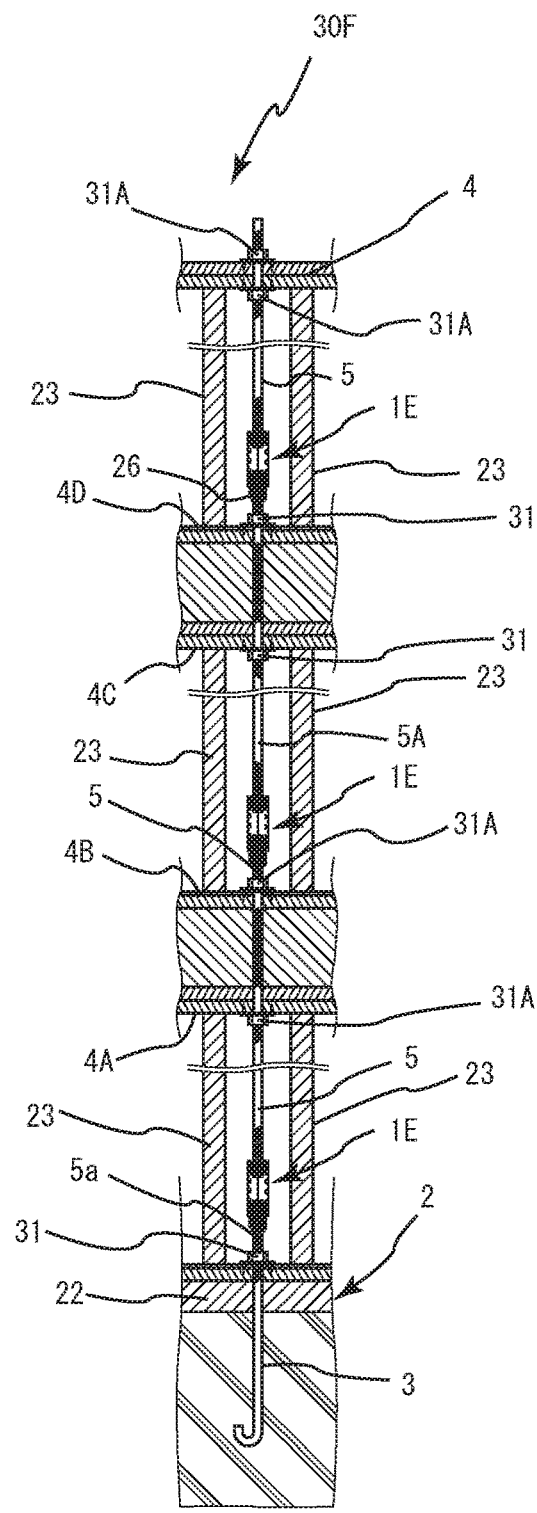
FIG. 24 is an explanatory diagram according to a seventh embodiment for carrying out the present invention.
Figure 25:
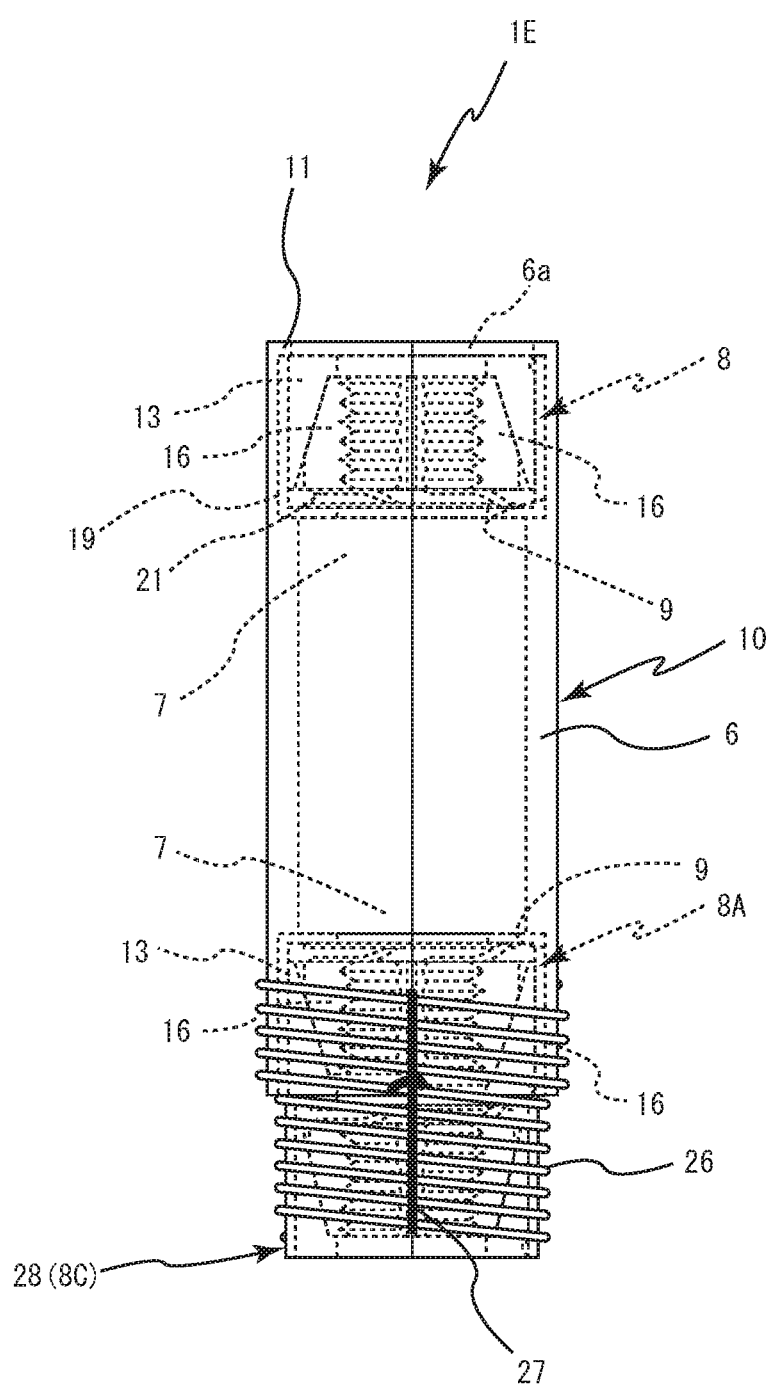
FIG. 25 is a front view of a coupling nut according to the seventh embodiment for carrying out the present invention.
Figure 26:
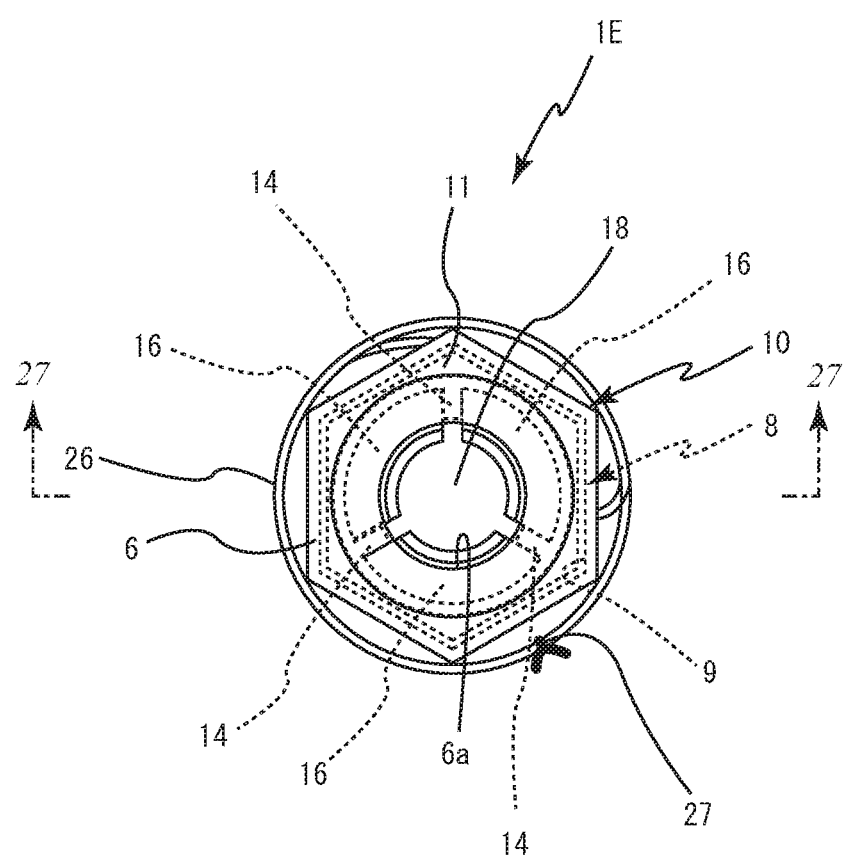
FIG. 26 is a planar view of the coupling nut according to the seventh embodiment for carrying out the present invention.
Figure 27:
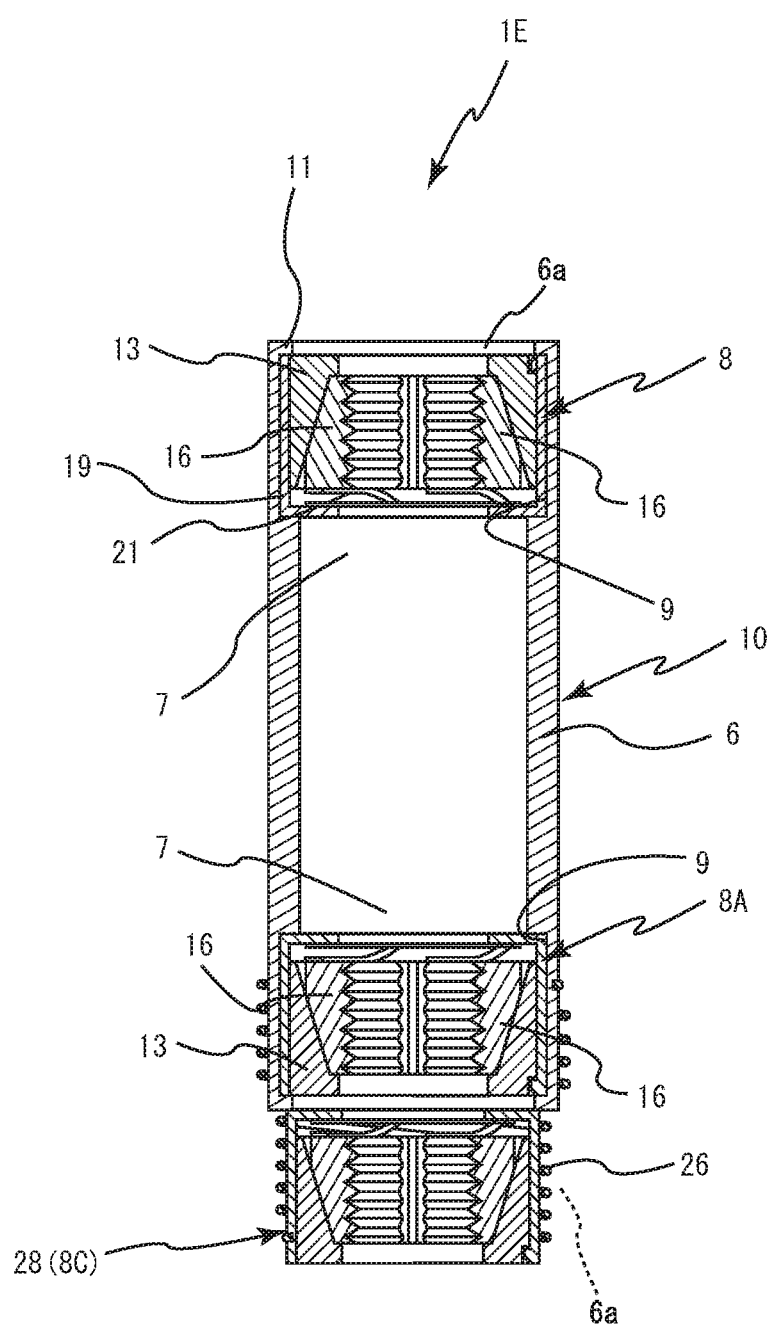
FIG. 27 is a cross-sectional view taken along line 27-27 in FIG. 26.
Figure 28:
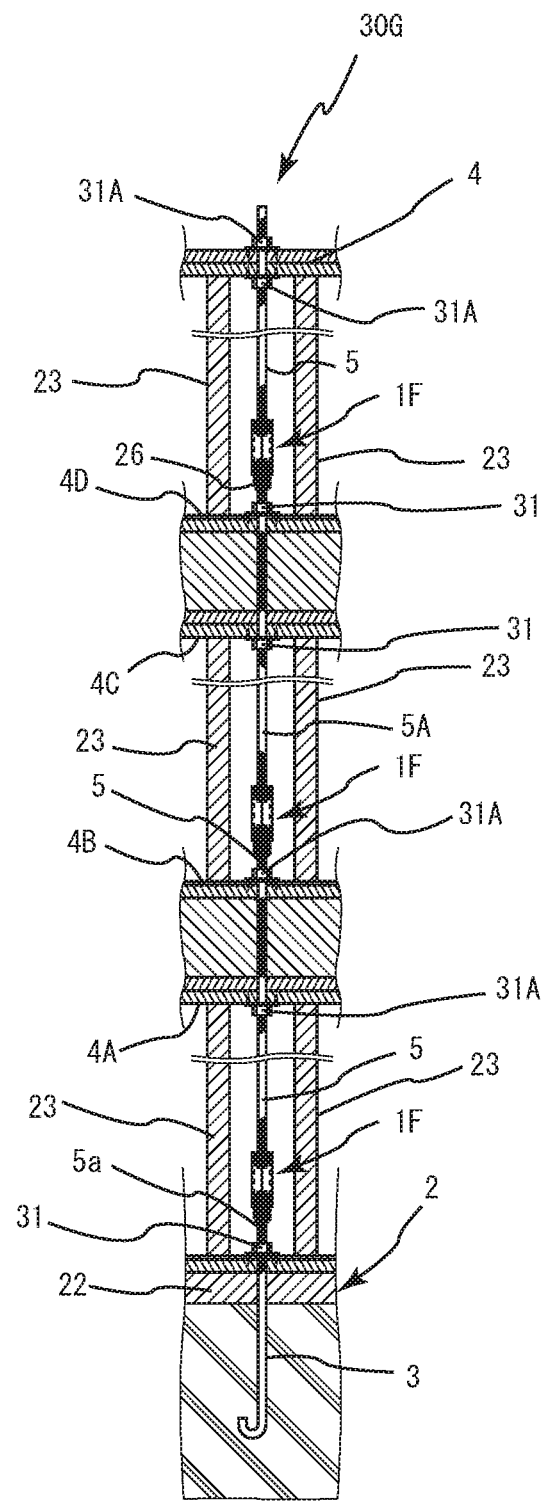
FIG. 28 is an explanatory diagram according to an eighth embodiment for carrying out the present invention.
Figure 29:
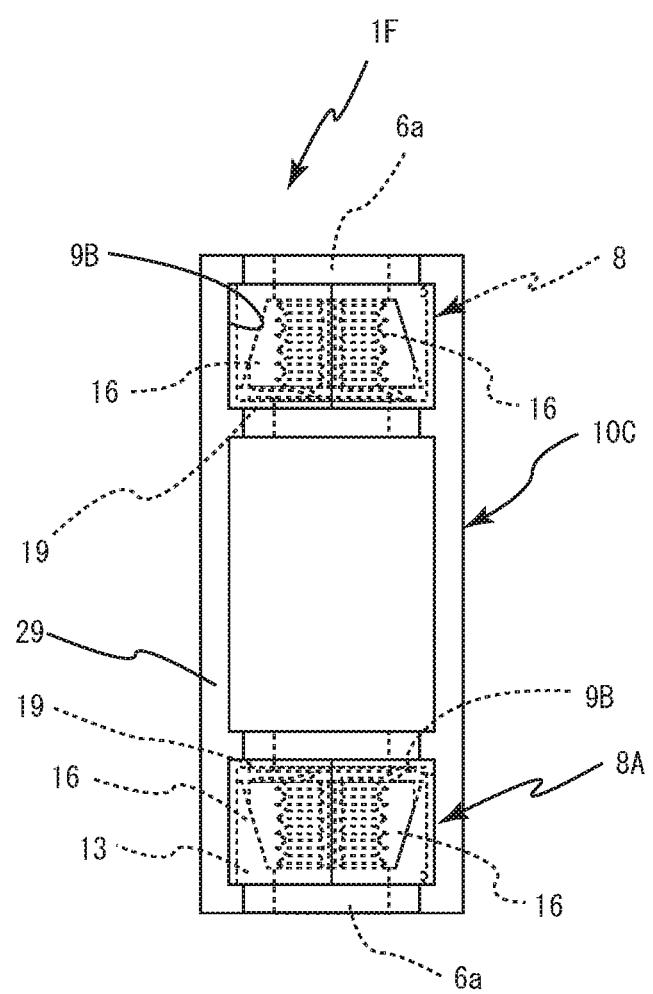
FIG. 29 is a front view of a coupling nut according to the eighth embodiment for carrying out the present invention.
Figure 30:
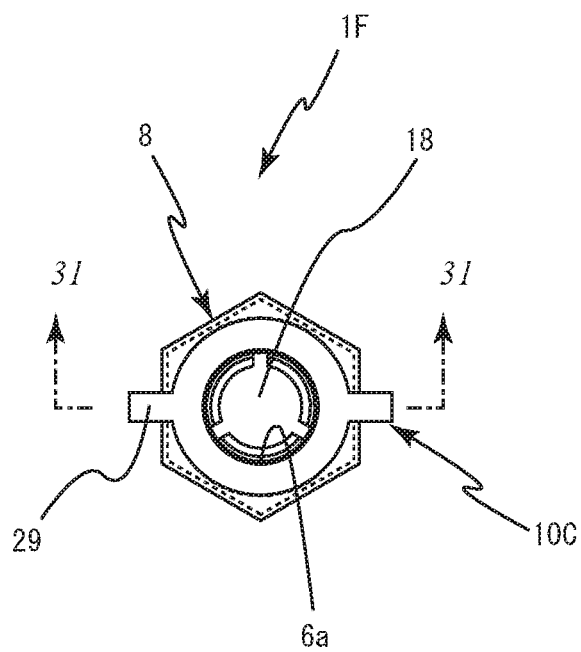
FIG. 30 is a planar view of the coupling nut according to the eighth embodiment for carrying out the present invention.
Figure 31:
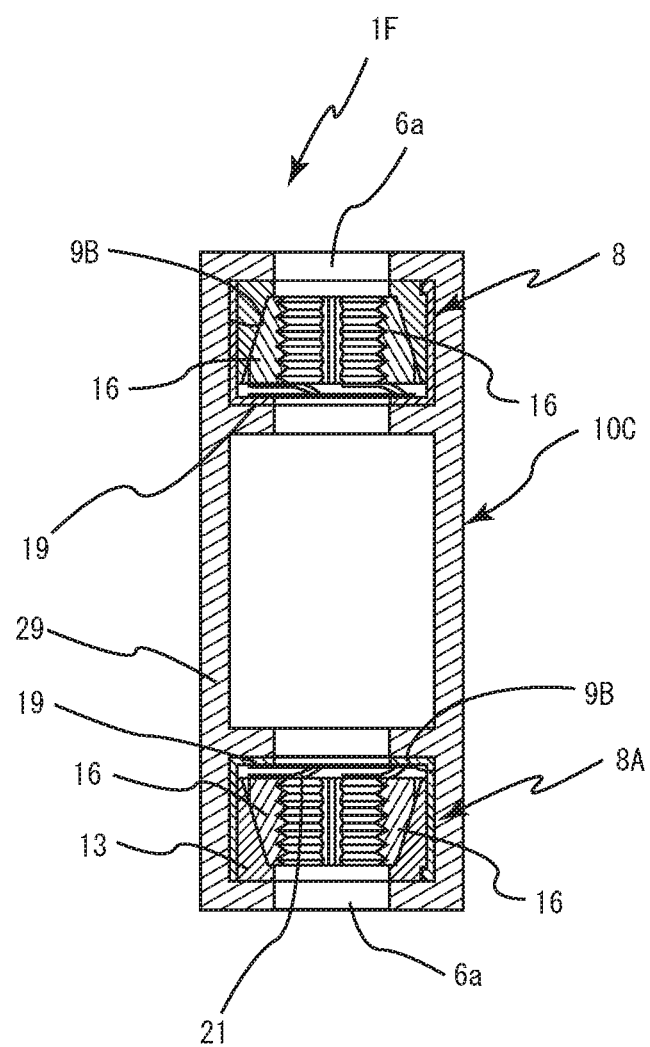
FIG. 31 is a cross-sectional view taken along line 31-31 in FIG. 30.

A sixth embodiment for carrying out the present invention shown in FIG. 21 to FIG. 23 mainly differs from the above-described first embodiment for carrying out the present invention in that characters R and L are formed or printed to indicate whether the simple fastening nut housing portions 9 and 9 in both end portions house the right-hand thread simple fastening nut 8 or the left-hand thread simple fastening nut 8A. A coupling nut 1D that is configured as described above and a reinforcing construction method 30E for wooden housing also achieve working effects similar to those according to the above-described first embodiment for carrying out the present invention.

Similar working effects are achieved even when the characters R and L are provided on the cover cylinders 24 and 24 of the blocking means 11A.

A seventh embodiment for carrying out the present invention shown in FIG. 24 to FIG. 27 mainly differs from the above-described first embodiment for carrying out the present invention in that a coil spring 26 and a fixing band 27 are connected. The coil spring 26 is attached such as to apply rotational force to the simple fastening nut housing portion 9 in one end portion of the simple fastening nut housing case 10 and a fixture 28 that is disposed further towards the outer side than the simple fastening nut housing portion 9 in the one end portion and is capable of being fixed at a predetermined position on the bolt. The fixing band 27 fixes the coil spring 26 such that the coil spring 26 does not operate until use. A coupling nut 1E that is configured as described above and a reinforcing construction method 30F for wooden housing also achieve working effects similar to those according to the above-described first embodiment for carrying out the present invention. In addition, the simple fastening nut housing case 10 and the simple fastening nut 8A are pulled toward the fixture 28 side, rotational force is applied, and play between nuts is eliminated at all times.

The coil spring 26 may be joined to the bolt and nut even when the coil spring 26 is that which does not apply tension. When the nut is continuously rotated to the left after joining, the spring is wound. The joined bolt does not loosen at this time.

The fixture 28 may be a simple fastening nut 8C into which a bolt is able to be inserted to a predetermined position, an ordinary nut, or a cylindrical member that is able to be fixed at a predetermined position on the bolt by pressure bonding. Alternatively, the fixture 28 may be configured such that a bolt-screwing coil portion having a diameter that screws together with the bolt is formed on one end portion of the coil spring 26 and an outer peripheral portion of the bolt-screwing coil portion is pressure-bonded and fixed by a cylindrical member.

An eighth embodiment for carrying out the present invention shown in FIG. 28 to FIG. 31 mainly differs from the above-described first embodiment for carrying out the present invention in that a simple fastening nut housing case 10C is used. The simple fastening nut housing case 10C is composed of a frame-like frame 29 that has a rectangular shape, an elliptical shape, or the like, in which bolt insertion holes 6a and 6a into which the through bolts 5 and 5 to be coupled are able to be respectively inserted from both end portions are formed, and that can be used as a turnbuckle, and simple fastening nut housing portions 9B and 9B that are formed in sections towards both end portions of the frame 29 and are able to house, in a non-rotatable manner, the simple fastening nuts 8 and 8A that screw together with the bolts 5 and 5 inserted into the bolt insertion holes 6a and 6a. A coupling nut 1F that is configured using the simple fastening nut housing case 10C such as this and a reinforcing construction method 30G for wooden housing also achieve working effects similar to those according to the above-described first embodiment for carrying out the present invention.

According to the embodiments of the invention of the present application, a configuration in which the simple fastening nuts 8 (8A) are used above and below the beam 4 is described. However, the present invention is not limited thereto. A configuration in which the simple fastening nut 8 (8A) is used only on an upper surface of the beam is also possible.

Furthermore, according to the embodiments of the invention of the present application, a three-story wooden housing is mainly described as an example. However, the present invention is not limited thereto. For example, the present invention may be used in a five-story wooden housing.

INDUSTRIAL APPLICABILITY

The present invention is used in an industry for manufacturing coupling nuts used to couple bolts in wooden housing and the like.

What is claimed is:

1. A coupling nut comprising:
a polygonal cylindrical member having neither internal nor external threads and having a polygonal internal and external shape in radial planes of the polygonal cylindrical member, the polygonal cylindrical member having two mutually opposite end portions, an end of each of the end portions constituting a respective end of the polygonal cylindrical member and through each of the ends of the polygonal cylindrical member is formed a respective bolt insertion hole configured for insertion therethrough of a respective bolt, each respective bolt insertion hole being formed by a respective annular end wall of the polygonal cylindrical member, the polygonal cylindrical member being of greater internal diameter at the end portions than a smaller internal diameter portion contiguous with the end portions, a respective radially inwardly extending annular surface being formed by annular walls of the polygonal cylindrical member at each respective transition from the greater internal diameter at a respective one of the end portions of the polygonal cylindrical member to the smaller internal diameter portion of the polygonal cylindrical member,
the coupling nut further comprising two simple fastening nuts, each respective one of the simple fastening nuts being of larger diameter than the smaller internal diameter portion of the polygonal cylindrical member, each respective one of the simple fastening nuts being non-rotatably received in a respective one of the end portions of the polygonal cylindrical member and configured to have a respective one of said bolts screwed therethrough, each of the simple fastening nuts having a same polygonal shape in axial planes of the simple fastening nut as the polygonal internal shape of the polygonal cylindrical member and being sized so as to fit into the respective end portion non-rotatably relative to the polygonal cylindrical member, the simple fastening nuts together with the polygonal cylindrical member forming a continuous passage from one of the ends of the polygonal cylindrical member to the other of the ends of the polygonal cylindrical member, and one of the simple fastening nuts having a left-hand internal thread and no external thread and the other of the simple fastening nuts having a right-hand internal thread and no external thread, each of the internal threads being configured to engage threads of a respective one of said bolts; and
wherein each respective one of the simple fastening nuts comprises respective nut segments in which the internal thread of the respective simple fastening nut is formed and a respective simple fastening nut housing case in which the respective nut segments are non-rotatably received, the respective simple fastening nut housing case forming a radially inwardly extending annular surface on which a washer comprising a flat spring is supported, the flat spring being configured to bias the nut segments toward the end of the end portion of the polygonal cylindrical member in which the respective simple fastening nut is received and wherein each of the simple fastening nuts abuts against a respective one of the annular end walls of the polygonal cylindrical member and also abuts against a respective one of the radially inwardly extending surfaces whereby each of the simple fastening nuts is fixed against axial movement in the polygonal cylindrical member.

2. The coupling nut according to claim 1, wherein:
the simple fastening nuts housed inside the housing portion in both end portions have differing inner diameters.

3. A construction method comprising:
fixing an anchor bolt to a foundation of a building;
coupling a first through bolt to the anchor bolt by means of a first coupling nut therebetween; and
attaching the first through bolt to a first beam of the building above the foundation by passing the first through bolt through a through hole in the first beam and screwing a first washer-fitted simple fastening nut onto a portion of the first through bolt projecting above the through hole, wherein
the coupling nut is the coupling nut of claim 1.

4. The construction method according to claim 3, further comprising:
coupling a second bolt to the first bolt by means of a second coupling nut therebetween; and attaching the second through bolt to a second beam of the building above the first beam by passing the second through bolt through a through hole in the second beam and screwing a second washer-fitted simple fastening nut onto an end portion of the second through bolt projecting above the through hole in the second beam; and, optionally, attaching at least one respective additional through bolt to at least one successively higher respective additional beam by screwing a respective additional washer-fitted simple fastening nut onto a portion of the respective additional through bolt projecting above a through hole in the respective higher beam through which the respective additional through bolt is passed, and coupling, by means of a respective additional coupling nut therebetween, the respective additional through bolt to the through bolt connected to the next lower beam, wherein each of the coupling nuts is the coupling nut of claim 1.

* * * * *